United States Patent
Moriya

(10) Patent No.: US 11,930,151 B2
(45) Date of Patent: Mar. 12, 2024

(54) IMAGE PROCESSING APPARATUS FOR REDUCING LIKELIHOOD OF AUTHENTICATION INFORMATION FOR A CHAT SERVICE BEING LEAKED

(71) Applicant: CANON KABUSHIKI KAISHA, Tokyo (JP)

(72) Inventor: Akihiro Moriya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 17/123,989

(22) Filed: Dec. 16, 2020

(65) Prior Publication Data
US 2021/0195061 A1 Jun. 24, 2021

(30) Foreign Application Priority Data
Dec. 20, 2019 (JP) .................. 2019-230918

(51) Int. Cl.
| | |
|---|---|
| H04N 1/44 | (2006.01) |
| G06F 3/14 | (2006.01) |
| H04L 9/40 | (2022.01) |
| H04N 1/00 | (2006.01) |
| H04L 51/046 | (2022.01) |

(52) U.S. Cl.
CPC ............ *H04N 1/4426* (2013.01); *G06F 3/14* (2013.01); *H04L 63/083* (2013.01); *H04N 1/00411* (2013.01); *H04N 1/00811* (2013.01); *H04L 51/046* (2013.01)

(58) Field of Classification Search
None
See application file for complete search history.

(56) References Cited

U.S. PATENT DOCUMENTS

| | | | |
|---|---|---|---|
| 10,021,049 B2* | 7/2018 | Hwang | H04L 67/06 |
| 10,212,110 B2* | 2/2019 | Lee | H04L 65/765 |
| 2014/0063562 A1* | 3/2014 | Lee | H04N 1/00122 |
| | | | 358/439 |
| 2016/0050326 A1* | 2/2016 | Lee | H04N 21/64322 |
| | | | 358/402 |

(Continued)

FOREIGN PATENT DOCUMENTS

JP  2015126318 A  7/2015

*Primary Examiner* — Miya J Cato
*Assistant Examiner* — Pawan Dhingra
(74) *Attorney, Agent, or Firm* — Canon U.S.A., Inc. IP Division

(57) ABSTRACT

An image processing apparatus that communicates with a chat server for controlling, based on received information indicating a talk room of the chat server and received information corresponding to a user, display of image data received from the user, in the talk room. The image processing apparatus includes a reception unit configured to receive predetermined information corresponding to the user, by transmitting authentication information for the user to log into a chat service, to the chat server, and a storage unit configured to store the predetermined information received by the reception unit, instead of the authentication information, in association with identification information for the user to log into the image processing apparatus. The image data, information indicating the specified talk room, and the predetermined information are transmitted to the chat server.

19 Claims, 19 Drawing Sheets

(56) References Cited

U.S. PATENT DOCUMENTS

| | | | |
|---|---|---|---|
| 2016/0124689 A1* | 5/2016 | Nishino | H04N 1/4426 |
| | | | 358/1.14 |
| 2016/0234135 A1* | 8/2016 | Kim | H04L 51/08 |
| 2017/0094514 A1* | 3/2017 | Kelts | H04W 12/08 |
| 2017/0344618 A1* | 11/2017 | Horowitz | G06F 16/27 |
| 2019/0116147 A1* | 4/2019 | Arisada | G06F 3/04817 |
| 2020/0099800 A1* | 3/2020 | Noguchi | H04N 1/32662 |
| 2020/0236228 A1* | 7/2020 | Awatsu | H04L 51/02 |
| 2020/0304436 A1* | 9/2020 | Maruyama | H04L 12/1813 |
| 2021/0144266 A1* | 5/2021 | Tsukada | H04N 1/00411 |
| 2021/0160393 A1* | 5/2021 | Sugita | H04N 1/00472 |
| 2021/0195061 A1* | 6/2021 | Moriya | G06F 21/608 |
| 2021/0392093 A1* | 12/2021 | Mia | G06F 16/955 |

* cited by examiner

FIG.15A
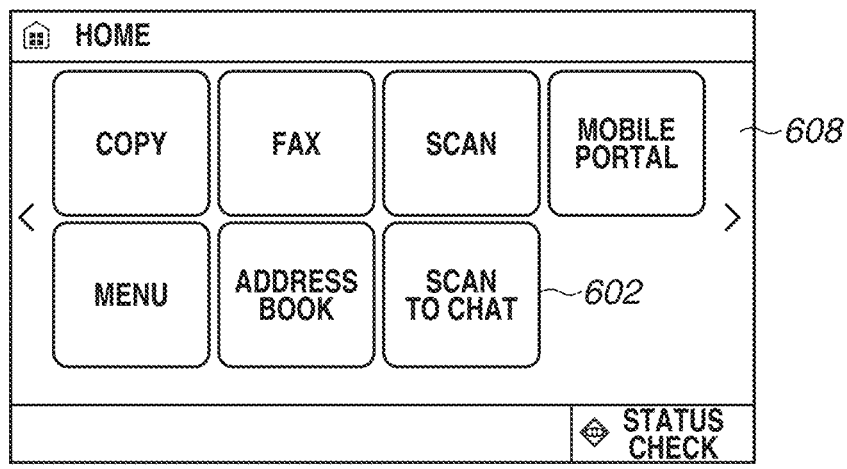
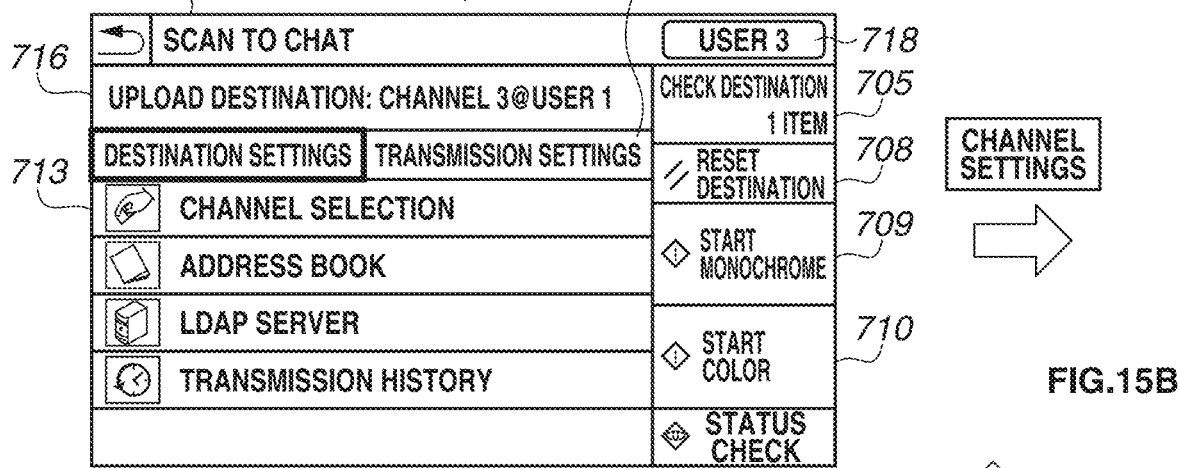
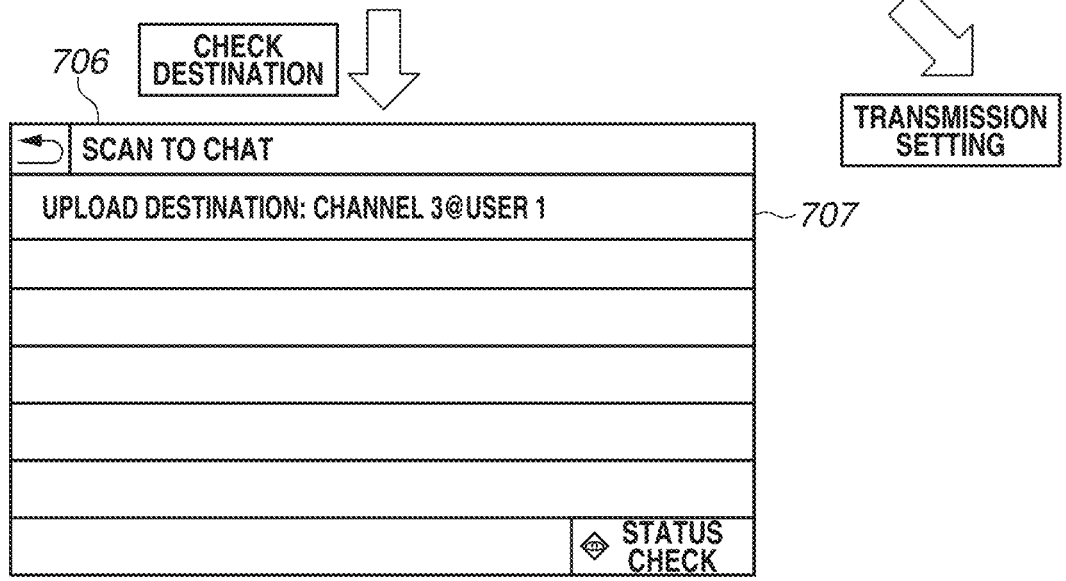

FIG.15B

715 — 714 CHANNEL SELECTION

CHANNEL SETTINGS →

- ☐ CHANNEL 1 ▽
- ☐ CHANNEL 2 ▽
- ■ CHANNEL 3 △
  - ■ USER 1
  - ☐ USER 2
  - ☐ USER 3

◆ STATUS CHECK

FIG.15A

↘ TRANSMISSION SETTINGS

712

↰ SCAN TO CHAT

| UPLOAD DESTINATION: CHANNEL 3@USER 1 | CHECK DESTINATION 1 ITEM |
| DESTINATION SETTINGS | TRANSMISSION SETTINGS | ╱ RESET DESTINATION |

717 —
- READING SIZE: A4
- FILE FORMAT: PDF
- TITLE: TEST TRANSMISSION
- TITLE: THIS IS TEST TRANSMISSION
- FILE NAME: DOCUMENTATION

◆ START MONOCHROME
◆ START COLOR
◆ STATUS CHECK

FIG.16

| DEVICE ID/USER ID | AUTHENTICATION INFORMATION (TOKEN) |
|---|---|
| USER 1 | xx USER TOKEN 1 |
| USER 2 | xx USER TOKEN 2 |
| USER 3 | xx USER TOKEN 3 |
| DEVICE 1 | xx BOT TOKEN 4 |
| DEVICE 2 | xx BOT TOKEN 5 |

IMAGE PROCESSING APPARATUS FOR REDUCING LIKELIHOOD OF AUTHENTICATION INFORMATION FOR A CHAT SERVICE BEING LEAKED

BACKGROUND

Field

The present disclosure relates to an image processing apparatus, a method for controlling the same, and a storage medium.

Description of the Related Art

Japanese Patent Application Laid-Open No. 2015-126318 discusses an image processing apparatus that transmits, to share image data generated by scanning an image of a document, the generated image data to a file server on a network.

When using a chat service offered on the Internet to display image data generated through image scanning in a talk room of the chat service, the following problems arise. For example, as discussed in Japanese Patent Application Laid-Open No. 2015-126318, an image processing apparatus that transmits generated image data to a file server via Server Message Block (SMB) communication can neither specify a talk room of a chat service nor enable the user to display the image data in a desired talk room.

To display the user who has displayed image data generated by an image processing apparatus in a talk room, it is assumed that an image processing apparatus stores user identification information for logging into an image processing apparatus and user authentication information for a chat service in an associated manner.

If an image processing apparatus used by a large number of users stores user authentication information for the chat service, authentication information used in the chat service may possibly be leaked.

The authentication information used in the chat service may possibly be used in other services. Therefore, if the authentication information for logging in is leaked, services other than the chat service may possibly be subject to improper log in.

SUMMARY

The present disclosure has been devised in view of the above-described issues, and is directed to reducing the possibility that authentication information for a chat service is leaked while making it possible to determine which user displayed image data generated through image scanning by an image processing apparatus.

The image processing apparatus according to the present disclosure is an image processing apparatus that communicates with a chat server for controlling, based on received information indicating a talk room of the chat server and received information corresponding to a user, display of image data received from the user as a transmission source, in the talk room. The image processing apparatus includes a reception unit configured to receive predetermined information corresponding to the user generated by the chat server, by transmitting, to the chat server, authentication information for the user to log into a chat service, a storage unit configured to store the predetermined information received by the reception unit, instead of the authentication information, in association with identification information for the user to log into the image processing apparatus, a reading unit configured to read an image of a document to generate image data based on the image, and a specification unit configured to specify a talk room of the chat server. The image data, information indicating the talk room specified by the specification unit, and the predetermined information are transmitted to the chat server.

Further features of the present disclosure will become apparent from the following description of exemplary embodiments with reference to the attached drawings.

BRIEF DESCRIPTION OF THE DRAWINGS

FIGS. 15A and 15B illustrate an example of a screen transition in the scan-to-chat processing.

FIG. 16 illustrates an example of a correspondence between identifications (IDs) and token information.

DESCRIPTION OF THE EMBODIMENTS

Exemplary embodiments of the present disclosure will be described below with reference to the accompanying drawings. Configurations according to the following exemplary embodiments are to be considered as illustrative, and the present disclosure is not limited to illustrated configurations.

Figure 1:
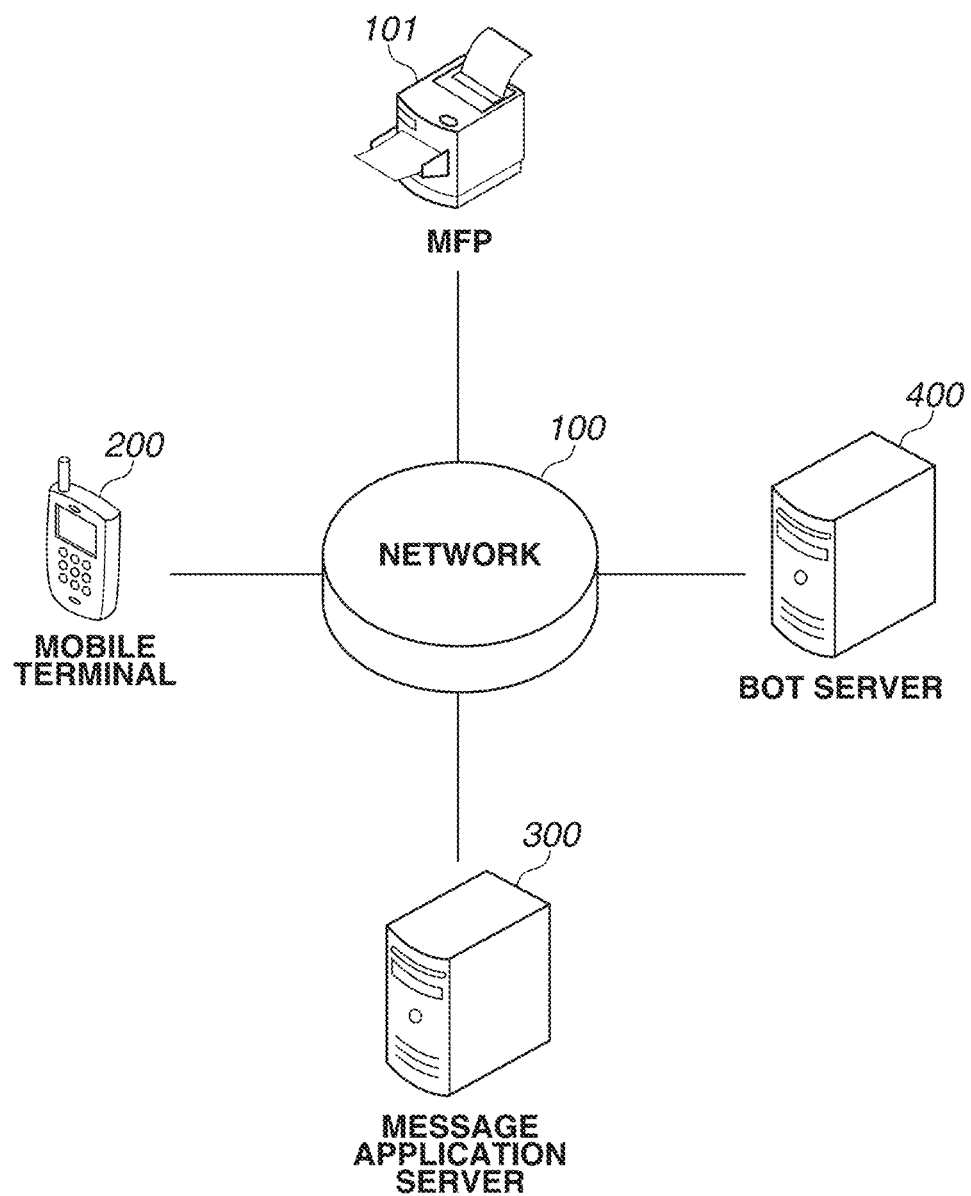
FIG. 1 illustrates an example of a system configuration of the present disclosure.

FIG. 1 illustrates an example of a system configuration of the present disclosure. The system configuration according to a first exemplary embodiment includes a mobile terminal 200 as an example of a terminal apparatus, a multifunction peripheral (MFP) 101 as an image processing apparatus capable of performing communication via a network 100, and a message application server 300. A bot server 400 is also connected via the network 100 for communication. The message application server 300 is a chat server that receives messages and image data transmitted from the MFP 101 and the mobile terminal 200, and manages a chat service (message service) displayed on the mobile terminal 200 and a personal computer (PC) (not illustrated) via user operations. The bot server 400 associates the MFP 101 with information (bot token information) corresponding to a bot application installed on the message application server 300 and then transmits a request from the MFP 101 to the message application server 300. The network 100 according to the present exemplary embodiment may be the Internet or a Local Area Network (LAN). The network 100 may be either a wired network or a wireless network.

Figure 2:
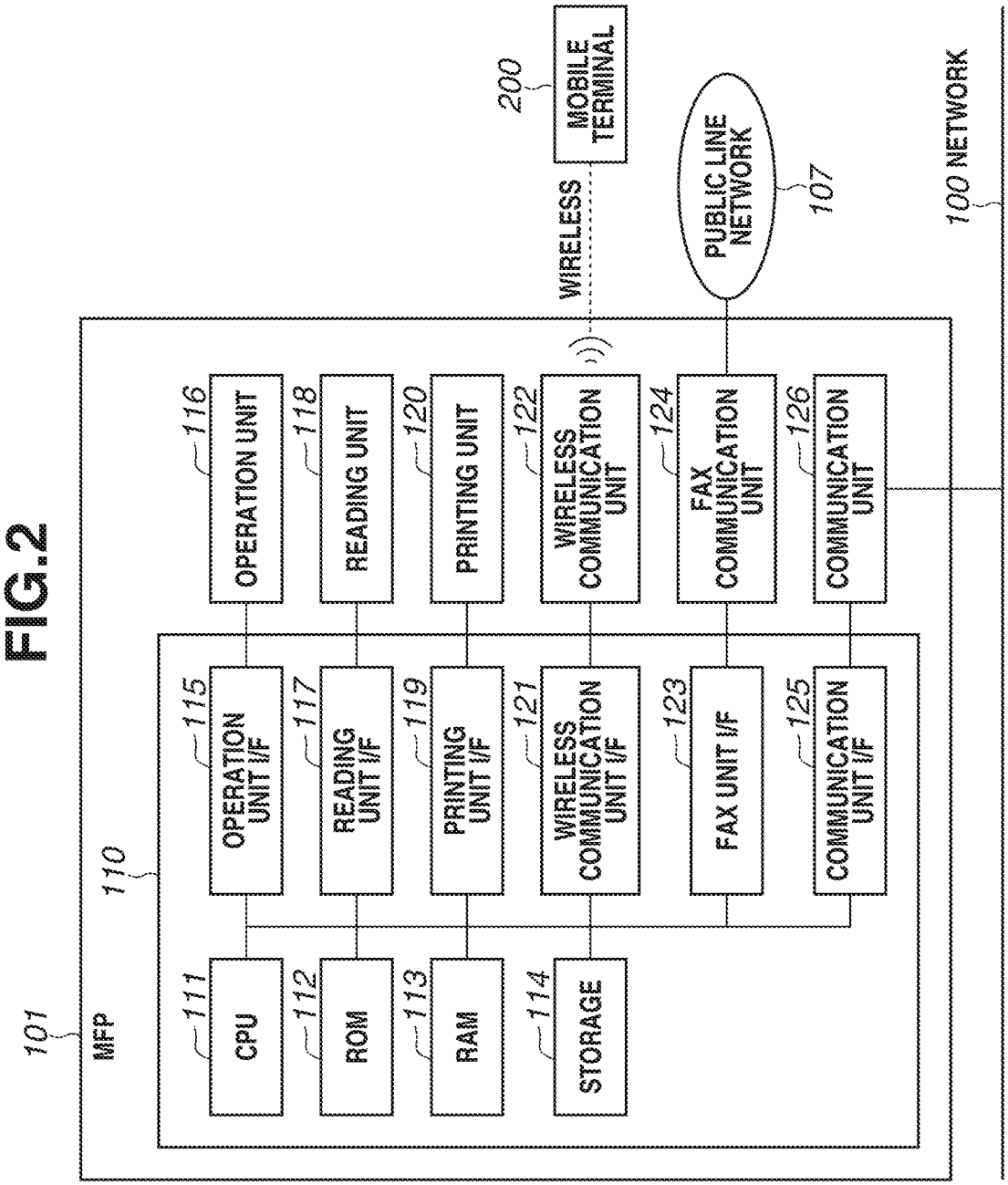
FIG. 2 illustrates an example of a hardware configuration of a multifunction peripheral (MFP).

FIG. 2 illustrates an example of a hardware configuration of the MFP 101. The MFP 101 includes a central processing unit (CPU) 111, a read only memory (ROM) 112, a random access memory (RAM) 113, a storage 114, an operation unit interface (I/F) 115, an operation unit 116, a reading unit I/F 117, a reading unit 118, a printing unit I/F 119, a printing unit 120, a wireless communication unit I/F 121, and a wireless communication unit 122. The MFP 101 further includes a FAX unit I/F 123, a FAX communication unit 124, a communication unit I/F 125, and a communication unit 126.

A control unit 110 including the CPU 111 controls operations of the entire MFP 101. The CPU 111 loads a control program stored in the ROM 112 or the storage 114 into the RAM 113 and performs various types of control such as reading control and print control. The ROM 112 stores the control program that can be executed by the CPU 111. The ROM 112 also stores a boot program and font data. The RAM 113 is the main storage memory and is used as a work area and a temporary storage area for loading various control programs stored in the ROM 112 and the storage 114. The storage 114 stores image data, print data, various programs, and various setting information. Although the present exemplary embodiment assumes a flash memory as the storage 114, an auxiliary memory such as a Solid State Drive (SSD) and a Hard Disk Drive (HDD) may also be used. In addition, embedded Multi Media Card (eMMC) may also be usable.

Although, in the MFP 101 according the present exemplary embodiment, one CPU 111 performs processing in flowcharts (described below) by using one memory (RAM 113), the present disclosure is not limited thereto. For example, a plurality of CPUs, RAMs, ROMs, and storages may be collaboratively operated to perform processing in flowcharts (described below). Part of processes may be performed by using hardware circuitry such as an Application Specific Integrated Circuit (ASIC) and a Field Programmable Gate Array (FPGA).

The operation unit I/F 115 connects the operation unit 116 including a display unit, such as a touch panel, and hardware keys with the control unit 110. The operation unit 116 displays information to the user and detects an input from the user.

The reading unit I/F 117 connects the reading unit 118, such as a scanner, with the control unit 110. When the reading unit 118 reads an image of a document, the CPU 111 converts the image into image data such as binary data. The image data generated based on the image read by the reading unit 118 is transmitted to an external apparatus or printed on recording paper.

The printing unit I/F 119 connects the printing unit 120, such as a printer, with the control unit 110. The CPU 111 transfers image data (print data) stored in the RAM 113 to the printing unit 120 via the printing unit I/F 119. The printing unit 120 prints an image based on the transferred image data on recording paper fed from a feed cassette.

The wireless communication unit I/F 121, an interface for controlling the wireless communication unit 122, wirelessly connects an external wireless device (the mobile terminal 102) with the control unit 110.

The control unit 110 controls the FAX communication unit 124, such as a facsimile, via the FAX unit I/F 123 to connect to a public network 107. The FAX unit I/F 123, an interface for controlling the FAX communication unit 124, controls a modem for facsimile communication and a Network Control Unit (NCU) to enable connecting to a public network and controlling a facsimile communication protocol.

The communication unit I/F 125 connects the control unit 110 and the network 100. The communication unit I/F 125 enables the communication unit 126 to transmit image data and various information in the apparatus to an external apparatus on the network 100, and receive print data and information on the network 100 from an information processing apparatus on the network 100. As a method for transmitting and receiving information via the network 100, transmission and reception of data by E-mail and file transmission using other protocols, such as File Transfer Protocol (FTP), Server Message Block (SMB), and Web Distributed Authoring and Versioning (WEBDAV) can be employed. The communication unit I/F 125 also enables transmitting and receiving image data and various setting data via the network 100 in response to access from the mobile terminal 200, the message application server 300, and the bot server 400 in Hypertext Transfer Protocol (HTTP) communication.

Figure 3:
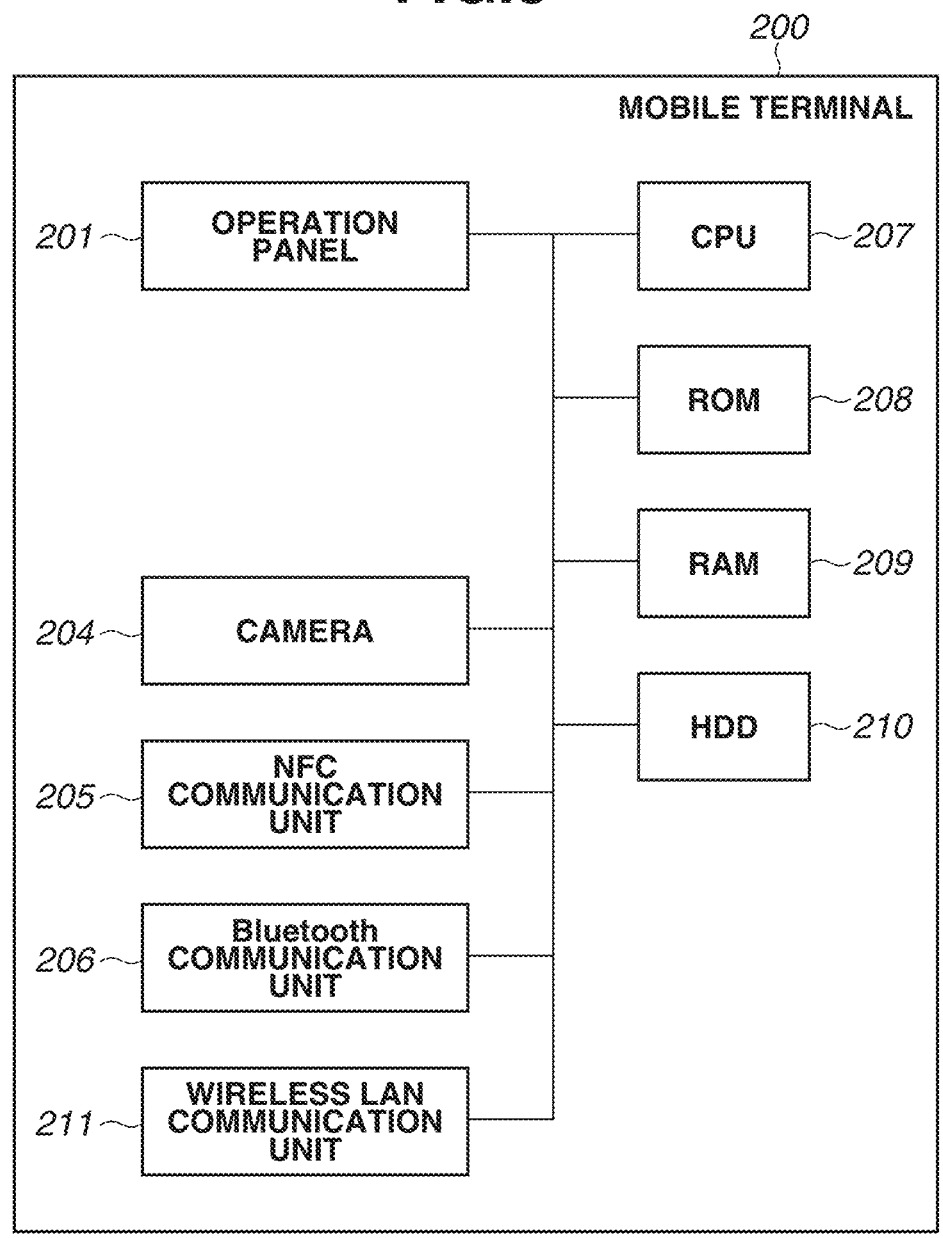
FIG. 3 illustrates an example of a hardware configuration of a mobile terminal.

FIG. 3 illustrates an example of a hardware configuration of the mobile terminal 200. Although a smart phone or tablet PC is assumed as the mobile terminal 200 according to the present exemplary embodiment, the mobile terminal 200 may also be an information processing apparatus capable of performing Wireless Fidelity (Wi-Fi) communication.

A CPU 207 reads a control program stored in a ROM 208 to perform various processing for controlling operations of the mobile terminal 200. A ROM 208 stores the control program. A RAM 209 is used as the main memory for the CPU 207 and a temporary storage area such as a work area. A hard disk drive (HDD) 210 stores various data such as photographs and electronic documents.

The operation panel 201 includes a touch panel function for detecting touch operations of the user and displays various screens offered by an operating system (OS) and an E-mail transmission application. The operation panel 201 is also used to confirm information stored in the message application server 300. The user can input a desired operation instruction to the mobile terminal 200 by performing a touch operation on the operation panel 201. The mobile terminal 200 includes hardware keys (not illustrated). The use of the hardware keys enables the user to input an operation instruction to the mobile terminal 200.

A camera 204 captures an image according to an imaging instruction of the user. A photograph captured by the camera 204 is stored in a predetermined area of the HDD 210. Using a program that enables Quick Response (QR) code® analysis, information can be acquired from the QR code read by the camera 204.

The mobile terminal 200 can transmit and receive data to/from various peripheral devices via a Near Field Communication (NFC) communication unit 205, a Bluetooth® communication unit 206, and a wireless LAN communication unit 211. The Bluetooth communication unit 206 of the mobile terminal 200 may conform to Bluetooth® Low Energy.

Figure 4:
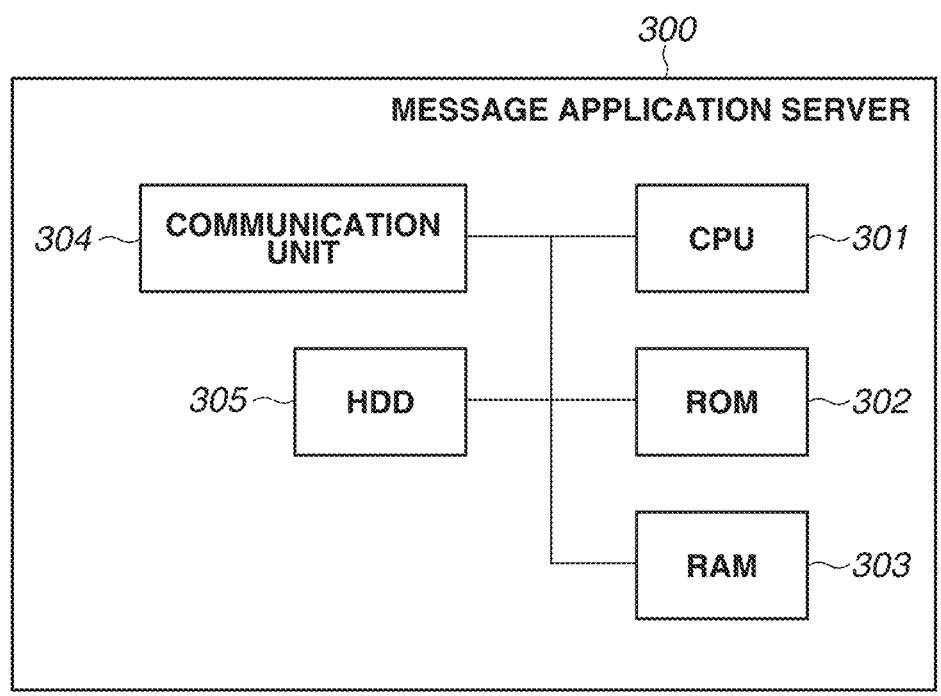
FIG. 4 illustrates an example of a hardware configuration of a message application server.

FIG. 4 illustrates an example of a hardware configuration of the message application server 300. A CPU 301 reads a control program stored in a ROM 302 and performs various processing for controlling operations of the message application server 300. The ROM 302 stores the control program. A RAM 303 is used as the main memory for the CPU 301 and a temporary storage area such as a work area. An HDD 305 stores various data such as messages, images, and channel information. The message application server 300 can transmit and receive data to/from various apparatuses such as the mobile terminal 200 and the MFP 101 via a communication unit 304. The communication unit 304 may perform wired communication using Ethernet® and wireless communication such as Wi-Fi.

Figure 5:
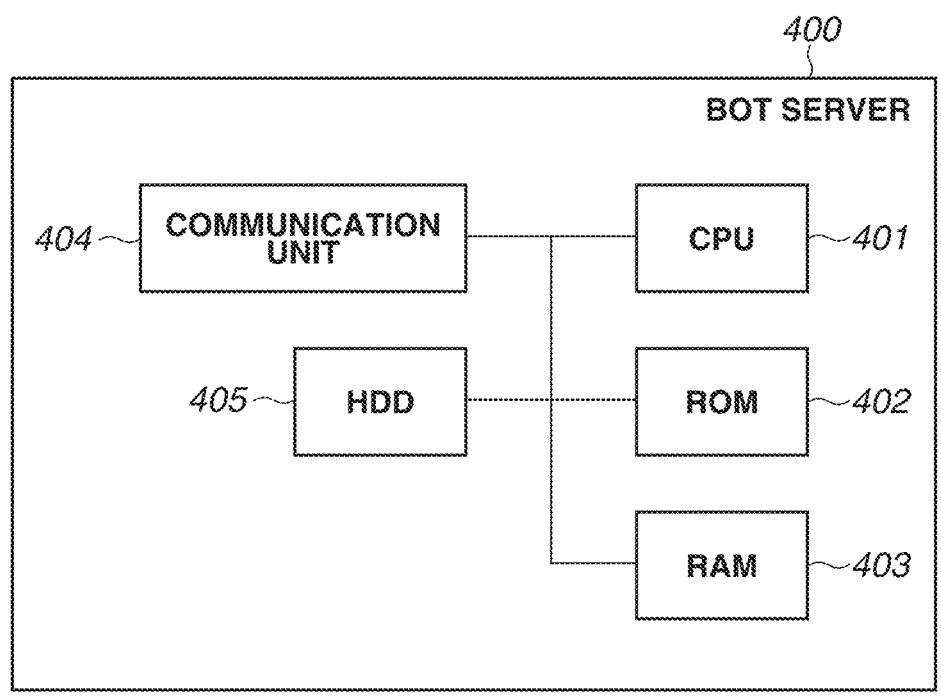
FIG. 5 illustrates an example of a hardware configuration of a bot server.

FIG. 5 illustrates an example of a hardware configuration of the bot server 400. A CPU 401 reads a control program stored in a ROM 402 and performs various processing for controlling operations of the bot server 400. The ROM 402 stores the control program. A RAM 403 is used as the main memory for the CPU 401 and a temporary storage area such as a work area. An HDD 405 stores various data such as messages, image data, and channel information. The bot server 400 can transmit and receive data to/from various apparatuses such as the mobile terminal 200, the MFP 101, and the message application server 300 via a communication unit 404.

Figure 14:
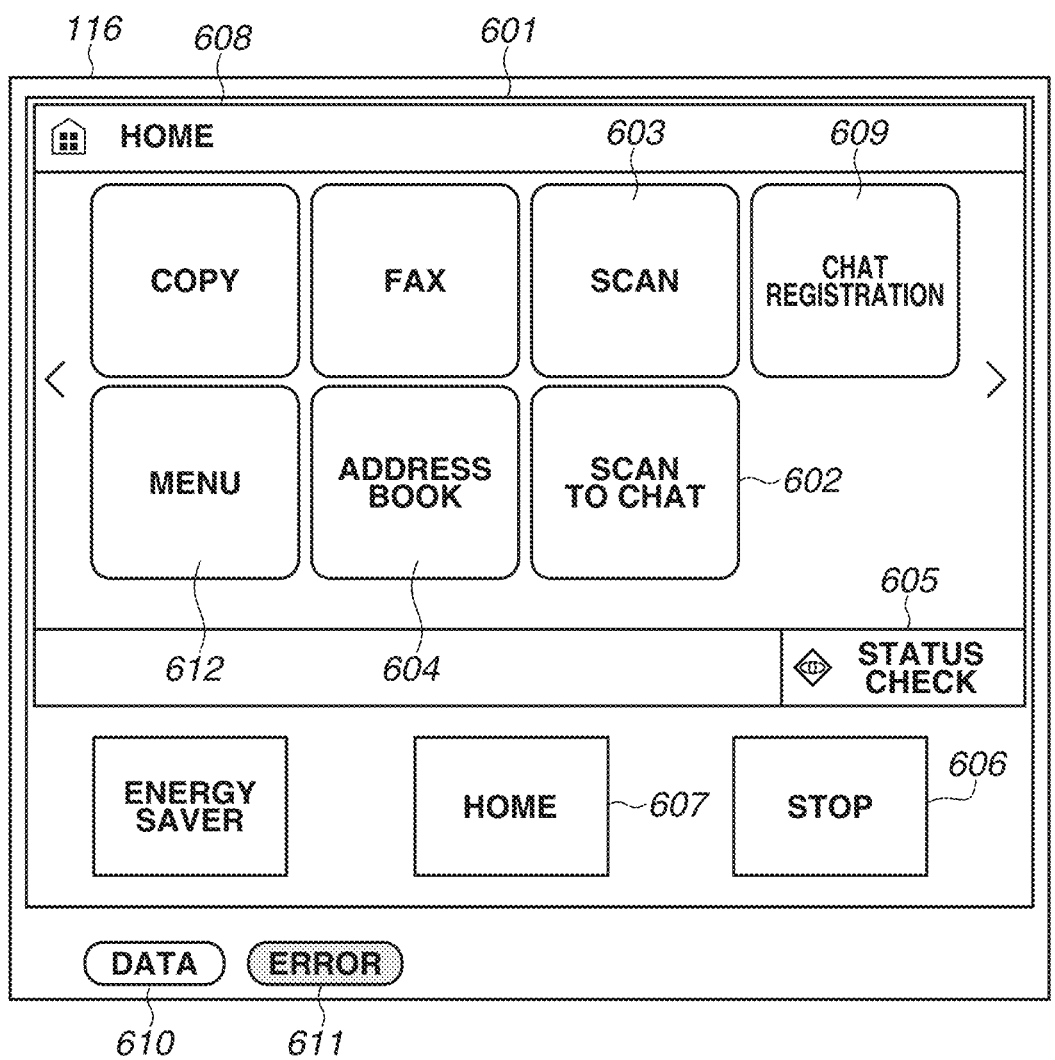
FIG. 14 illustrates an example of a Home screen displayed on an operation unit of the MFP.

FIG. 14 illustrates an example of a Home screen displayed on the operation unit 116 of the MFP 101. The operation unit 116 includes a touch panel 601 for displaying operation screens and light emitting diodes (LEDs) 610 and 611. The touch panel 601 is an instruction unit that also functions as an acceptance unit for accepting user instructions and as a display unit for displaying screens. The user directly touches the screen displayed on the touch panel 601 with an object such as a finger or stylus to instruct the MFP 101 to perform each function based on the displayed screen.

The touch panel 601 illustrated in FIG. 14 displays a Home screen 608. The Home screen 608 is the initial screen for instructing the MFP 101 to perform each function of the MFP 101. The Home screen 608 is used to display screens for performing various settings for functions performed by the MFP 101, such as Copy, Fax, Scan, and Media Print.

A Status Check button 605 is an object for displaying a screen (status check screen) for confirming the status of the MFP 101. The status check screen (not illustrated) enables displaying a transmission history and a job execution history.

A Scan-to-Chat button 602 is an object for displaying a setting screen for the scan-to-chat processing. When the user selects the Scan-to-Chat button 602, a setting screen 704 illustrated in FIG. 15 appears on the operation unit 116. The scan-to-chat processing will be described in detail below with reference to FIGS. 6 and 7.

A Scan button 603 is an object for displaying a scan selection screen (not illustrated) from the MFP 101. The Scan selection screen is a screen for selecting transmission functions including E-mail transmission (E-mail), file transmission such as SMB, FTP, and HTTP, and Internet fax (I fax) transmission. When the user touches the object indicating a displayed transmission function, the setting screen for each transmission function appears.

An Address Book button 604 is an object for displaying an Address Book screen 400 of the MFP 101 when selected by the user. The LEDs 610 and 611 notify the user of the status of the MFP 101. The LED 610 turns ON during reception and execution of an E-mail or a print job. The LED 611 turns ON if an error occurs in the MFP 101. A Stop button 606 is an object for canceling various operations. This object is constantly displayed on the operation unit 116. A Home button 607 is an object for displaying the Home screen 608. This object is constantly displayed on operation unit 116. A Menu button 612 is an object for displaying a screen for performing environmental settings such as the language to be used and performing settings for each function. A Chat Registration button 609 is an object for displaying a screen for associating user authentication information for the MFP 101 with user authentication information for the message application server 300. When the user selects the Chat Registration button 609, a Setting Registration Screen 1501 illustrated in FIG. 13 appears on the operation unit 116. The chat registration processing will be described in detail below with reference to FIGS. 17 and 18.

FIG. 16 illustrates an example of a correspondence between identifications (IDs) and token information. In a table 1600 illustrated in FIG. 16, a user ID 1601 and user token information 1602 are registered in an associated manner, and a device ID 1603 and bot token information 1604 are registered in an associated manner. The table 1600 is stored in the storage 114 of the MFP 101. In the table 1600, the bot token information 1604 associated with the device ID 1603 is registered when input in an input screen (not illustrated) by the user. The bot token information 1604 includes a random combination of character strings generated by the message application server 300, and is information corresponding to one bot application installed in the message application server 300. When the user transmits a request for acquiring the bot token information 1604 to the message application server 300 and displays the bot token information 1604 acquired on the PC, the user registers the bot token information 1604 to the MFP 101 while confirming the bot token information 1604.

The user ID 1601 and the device ID 1603 are pieces of information stored in the MFP 101. The user ID 1601 is user identification information set for each user using the MFP 101. The device ID 1603 is device identification information set for each MFP. The user ID 1601 is identification information set by the user when generating a user account for logging into the MFP 101, and the device ID 1603 is identification information specific to the MFP 101 set at the time of factory shipment.

Figure 18:
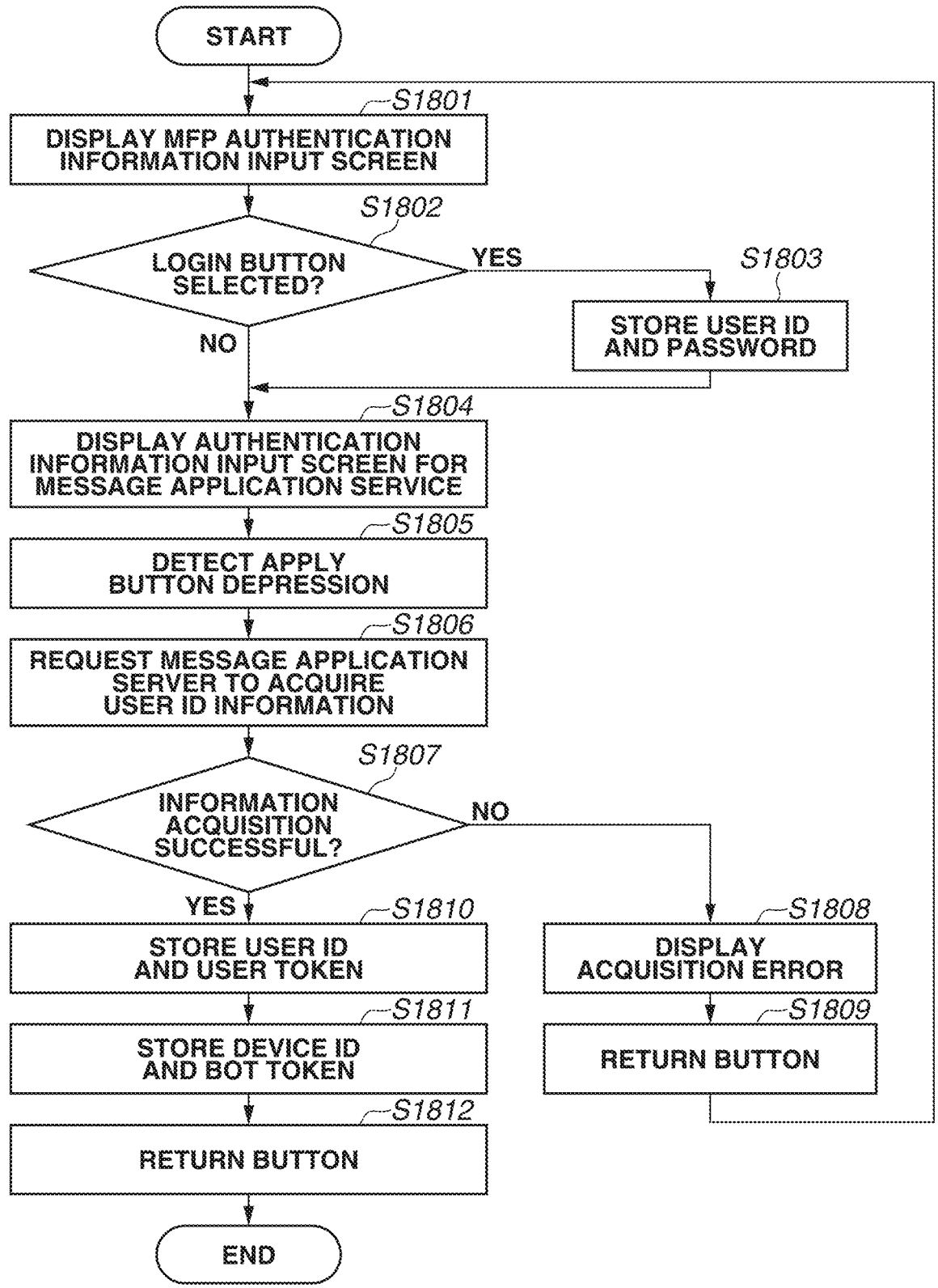
FIG. 18 is a flowchart illustrating an example of processing performed by the MFP to generate a table.

In the present exemplary embodiment, the table information is generated according to the flowchart illustrated in FIG. 18 and stored in the storage 114 of the MFP 101, the table information may be stored in the HDD 405 of the bot server 400. Examples including the bot server 400 will be described below in a second exemplary embodiment.

In a case where the user uses a chat service offered on the Internet and displays image data generated through image scanning in a talk room of the chat service, there arises the following problems. For example, as discussed in Japanese Patent Application Laid-Open No. 2015-126318, an image processing apparatus that transmits generated image data to a file server via SMB communication cannot specify a talk room of the chat service, and as a result, the user cannot display image data in a desired talk room.

To display the user who has displayed image data generated by an image processing apparatus in a talk room, it is assumed that an image processing apparatus stores user identification information for logging into an image processing apparatus and user authentication information for a chat service in an associated manner.

If an image processing apparatus used by a large number of users stores user authentication information for a chat service, authentication information used in the chat service may possibly be leaked.

Authentication information used in a chat service may possibly be used in other services. Therefore, if authentication information for logging in is leaked, services other than the chat service may possibly be subject to improper log in. The MFP 101 performs the following processing to solve the above-described problems.

Figure 17:
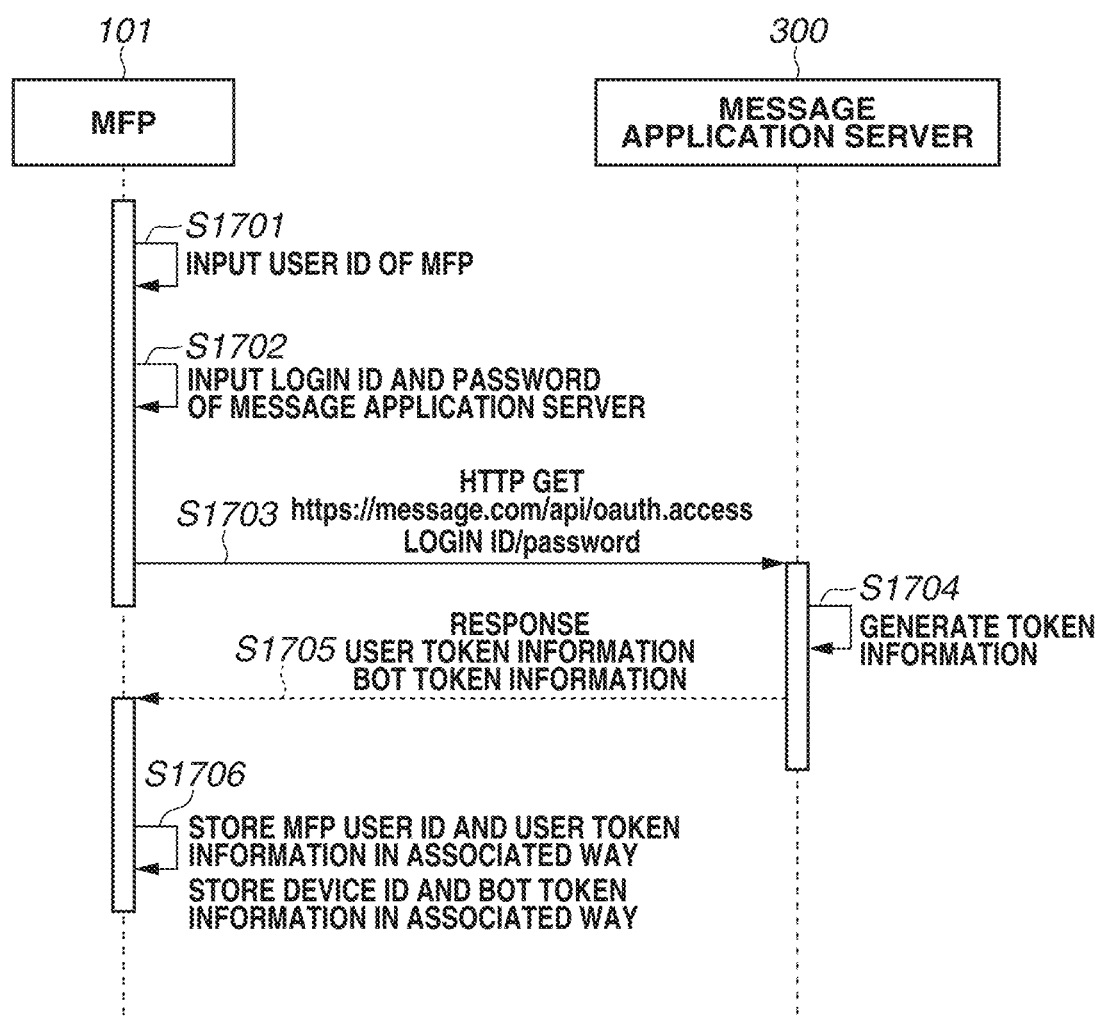
FIG. 17 illustrates an example of a sequence performed by the MFP to generate a table.

FIG. 17 illustrates an example of a sequence in which the MFP 101 generates the table 1600. This sequence is started when the user presses the Chat Registration button 609 in the Home screen 608.

Figure 13:
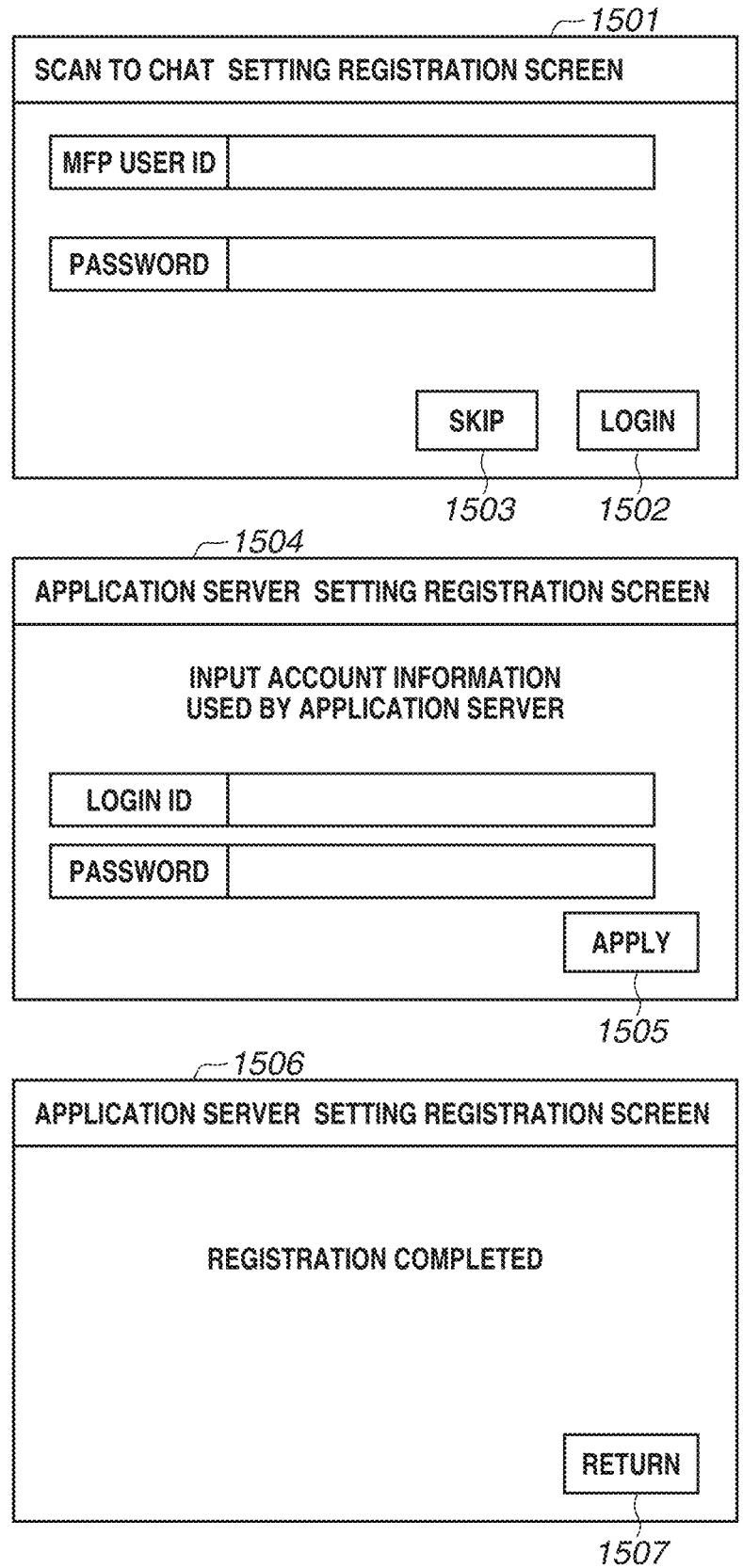
FIG. 13 illustrates an example of a setting screen.

In step S1701, the user inputs the user ID 1601 and a password via a Setting Registration screen 1501 illustrated in FIG. 13 displayed on the operation unit 116. If the MFP 101 is configured to authenticate a user based on the user ID 1601 and a password when the MFP 101 is used, the processing in step S1701 can be omitted by storing the authenticated user ID 1601 in the RAM 113.

In step S1702, the user inputs a login ID and a password for the message service to the MFP 101 via the operation unit 116. The login ID of the input message service is, for example, a mail address or other information that enables other persons to recognize which user's ID it is. The login ID and the password for the message service may also be used, for example, in a WEB mail service, a cloud storage service, and other message services. It is undesirable that the login ID and the password for this message service are leaked.

In step S1703, the CPU 111 of the MFP 101 requests the message application server 300 to acquire the user token information 1602 and the bot token information 1604 in HTTP communication. More specifically, the CPU 111 transmits information indicating a request for generating and returning the user token information 1602 and the bot token information 1604 based on the login ID and the password input on the MFP 101, to the message application server 300. An example of a command transmitted in this case is "HTTP GET https://message.com/api/oath.access". The Uniform Resource Locator (URL) "https://message.com/api/oath.access" described in this command is a URL for accessing the message application server 300. When the CPU 111 transmits the login ID and the password input in step S1702 to the URL, the message application server 300 performs processing for generating a token in step S1704.

In step S1704, the CPU 301 of the message application server 300 generates the user token information 1602 and the bot token information 1604 based on the user ID and the password received via the communication unit 304. The user token information 1602 and the bot token information 1604 are generated in a case where the combination of the login ID and the password received in step S1703 is registered (stored) as user authentication information in the message application server 300. If the combination of the login ID and the password received in step S1703 is not registered (stored) as user authentication information in the message application server 300, these pieces of token information are neither generated nor transmitted.

The user token information 1602 generated in this case is a character string including random combination of characters. One cannot understand what the character string stands for and which user is indicated by which character string. The bot token information 1604 is also a random combination of characters.

In step S1705, the CPU 301 of the message application server 300 controls the communication unit 304 to transmit the user token information 1602 and the bot token information 1604 to the MFP 101 as response information in HTTP communication.

In step S1706, as illustrated in table 1600, the CPU 111 of the MFP 101 stores the received user token information 1602 and the user ID 1601 input in step S1701 in the storage 114 in an associated manner. The CPU 111 also stores the bot token information 1604 and the device ID 1603 in the storage 114 in an associated manner. When the processing in step S1706 is completed, the CPU 111 deletes the login ID and the password for the message service stored in the RAM 113. Although, in this example, the login ID and the password are deleted, any type of processing may be performed as long as the MFP 101 enters a state where the login ID and the password for the message service input in step S1702 are not stored.

In the present exemplary embodiment, the MFP 101 stores the table 1600 in the storage 114, there is only one device ID. Therefore, the MFP 101 may store the received bot token information 1604 in the storage 114 as a token for the channel list acquisition, without associating the bot token information 1604 with the device ID, and transmit the bot token information 1604 to the message application server 300 in the processing in step S901 illustrated in FIG. 6 (described below).

FIG. 18 is a flowchart illustrating an example of processing in which the MFP 101 generates the table 1600. This flowchart is started when the user selects the Chat Registration button 609 in the Home screen 608. FIG. 13 illustrates screens displayed on the touch panel 601 of the operation unit 116 when the MFP 101 performs processing of this flowchart.

In step S1801, the CPU 111 of the MFP 101 displays the Setting Registration screen 1501 for receiving the user ID 1601 on the touch panel 601.

In step S1802, the CPU 111 of the MFP 101 determines whether a Login button 1502 of the input screen 1501 is selected via the operation unit 116. In a case where the Login button 1502 is not selected, the CPU 111 determines that a Skip button 1503 is selected. When the CPU 111 determines that the Login button 1502 is selected (YES in step S1802), the processing proceeds to step S1803. On the other hand, when the CPU 111 determines that the Login button 1502 is not selected (NO in step S1802), the processing proceeds to step S1804.

In step S1803, the CPU 111 of the MFP 101 stores the input user ID 1601 and password in the RAM 113.

In step S1804, the CPU 111 of the MFP 101 displays an input screen 1504 for inputting authentication information for the message service on the touch panel 601 and receives an input of the login ID and the password.

In step S1805, when the CPU 111 of the MFP 101 detects the selection of an Apply button 1505 via the operation unit 116, the CPU 111 stores the input login ID and password in the RAM 113. Then, the processing proceeds to step S1804.

In step S1806, the CPU 111 of the MFP 101 transmits the login ID and the password input in the input screen 1504 to the message application server 300 to request for the acquisition of the user token information 1602 and the bot token information 1604. More specifically, the CPU 111 transmits the login ID and the password input in the input screen 1504, and information indicating a request for the user token information 1602 and the bot token information 1604, to the message application server 300.

In step S1807, the CPU 111 determines whether the user token information 1602 and the bot token information 1604 have successfully been acquired from the message application server 300. If the CPU 111 determines that the information acquisition succeeded (YES in step S1807), the processing proceeds to step S1810. On the other hand, if the CPU 111 determines that the information acquisition failed (NO in step S1807), the processing proceeds to step S1808.

In step S1808, the CPU 111 of the MFP 101 displays a screen indicating that the information acquisition failed (not illustrated) on the touch panel 601. A screen 1506 displays a message to be displayed when the information acquisition succeeded. The CPU 111 changes the message displayed in this screen to information indicating that the information acquisition failed.

In step S1809, when the CPU 111 of the MFP 101 detects the selection of a Return button (not illustrated) displayed on the touch panel 601, the CPU 111 changes the screen display to the input screen 1501 that is the initial screen. Then, the processing returns to step S1801.

In step S1810, the CPU 111 of the MFP 101 generates table information by using the user ID 1601 stored in the RAM 113 and the received user token information 1602 and stores the table information in the storage 114. The message application server 300 can identify the user in a work space based on the user token information 1602. Therefore, when uploading information from the MFP 101, the user can perform the upload processing as a user to be managed by the message application server 300, by using the user token information 1602.

In step S1811, the CPU 111 of the MFP 101 generates table information by using the device ID 1603 and the received bot token information 1604 and stores the table information in the storage 114. If a user not having the user ID 1601 for logging into the MFP 101 uses the bot token information 1604, the user can upload information as a guest user. In this case, the upload for a chat room may be processed as an upload from a guest user (bot user) or as an upload from the account corresponding to the authentication information input by the user. The CPU 111 of the MFP 101 also displays the result display screen 1506 on the touch panel 601.

In step S1812, when the CPU 111 of the MFP 101 detects the depression of a Return button 1507 via the operation unit 116, the CPU 111 changes the screen display to the Home screen 608 and then ends the processing.

Figure 6:
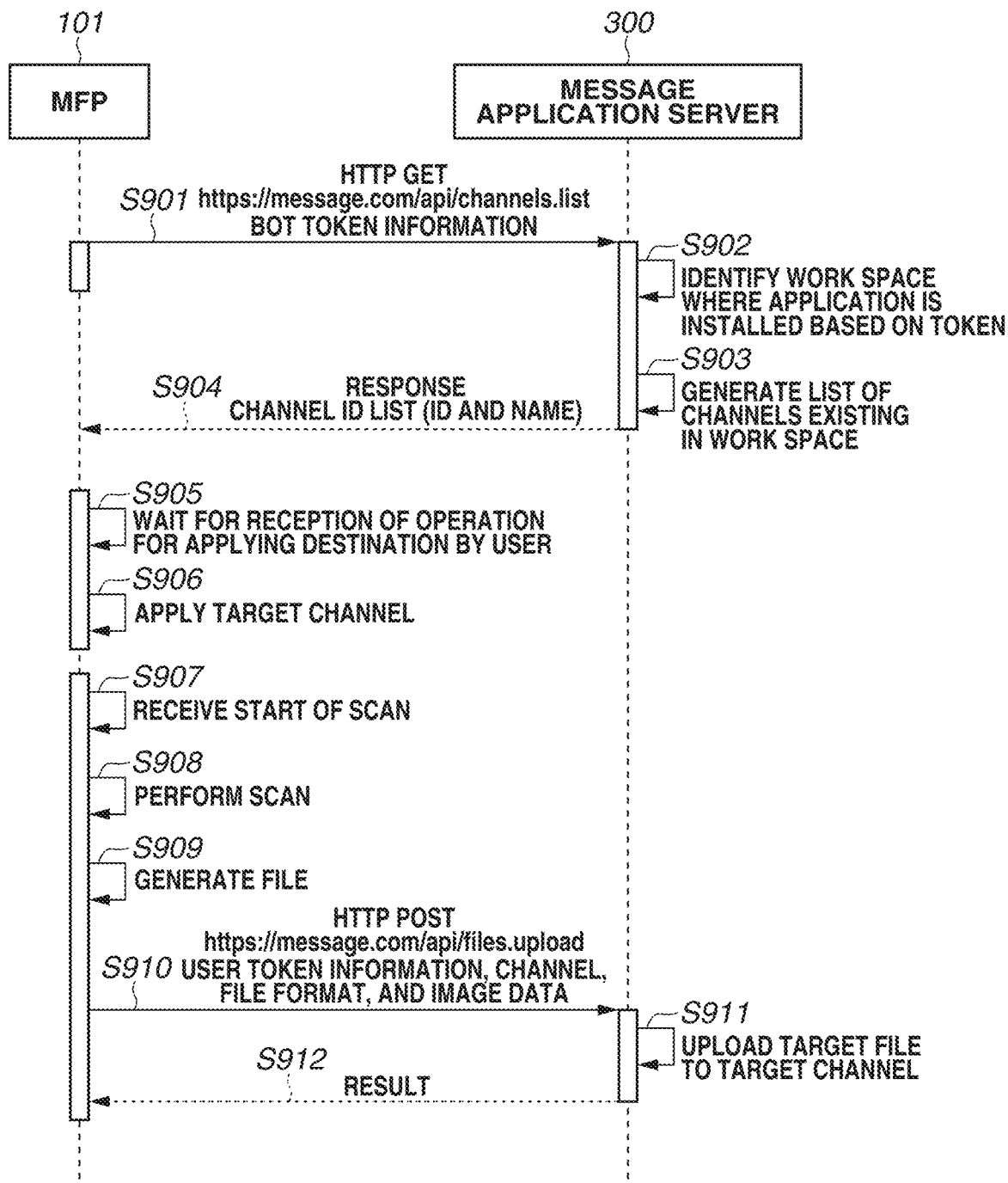
FIG. 6 illustrates an example of a sequence for transmitting a file generated through image scanning by the MFP to the message application server.

FIG. 6 illustrates an example of a sequence in which the MFP 101 generates a file through image scanning and transmits the file to the message application server 300. The sequence illustrated in FIG. 6 is started upon selection of a Channel Selection button 713 in the setting screen 704 illustrated in FIG. 15.

In step S901, the CPU 111 of the MFP 101 controls the communication unit 126 to request the message application server 300 for channel list information in HTTP communication. More specifically, the CPU 111 transmits, to the message application server 300, the bot token information 1604 registered in the MFP 101 and information indicating a request for a list of channels in the work space indicated by the bot token information 1604. An example of a command transmitted in this case is "HTTP GET https://message.com/api/channels.list". The URL "https://message.com/api/channels.list" described in this command is a URL for accessing the message application server 300. When the CPU 111 transmits the bot token information 1604 to this URL, the message application server 300 searches for the work space and the bot application corresponding to the bot token information 1604. The bot token information 1604 is input via the input screen 1501 illustrated in FIG. 13 displayed on the operation unit 116 of the MFP 101.

A work space is a kind of an organization to which a plurality of users belongs in the message application. A channel is a kind of a chat room in the work space. A chat room refers to a mechanism for enabling a plurality of users participating in the chat room to exchange messages with each other, like conversations. In the present exemplary embodiment, a channel will be described as a chat room, however, the present disclosure is not limited thereto as long as a chat room is a mechanism for enabling a plurality of users participating in the chat room to exchange messages with each other, like conversations. For example, a channel may be a kind of a group chat, room, talk room, or group.

A bot application is an application for registering the MFP 101 as a user in the message application and uploading messages and image data. A bot application is installed in the message application server 300. When a bot application is specified and image data is transmitted to the message application server 300, the bot application uploads the image data through a message application. The bot application and the bot token are stored in the HDD 305 of the message application server 300 in an associated manner, and the bot application and the work space are also associated with each other. Accordingly, upon reception of the bot token information 1604 from the MFP 101, the message application server 300 can return information about the work space associated with the bot application corresponding to the bot token information 1604. The bot token information 1604, the bot application, and the work space may be directly associated with each other. This enables the user to select the work space corresponding to pre-registered bot token information 1604 (the work space to which the user wants to transmit image data) from a large number of work spaces.

In step S902, referring to the bot token information 1604 received via the communication unit 304, the CPU 301 of the message application server 300 searches for the work space information corresponding to the bot token information 1604, and the bot application in the HDD 305.

In step S903, the CPU 301 of the message application server 300 confirms whether access to the URL is permitted, based on the bot token information 1604 received from the MFP 101 via the communication unit 304. In a case where access to the URL is permitted, the CPU 301 generates channel list information for channels included in the work space corresponding to the bot token information 1604. The channel list information is channel information arranged in list form. The channel information includes channel setting values indicating the channel ID, the channel name, information indicating users participating in the channel, and the archive channel setting.

In step S904, the CPU 301 of the message application server 300 controls the communication unit 304 to transmit the channel list information to the MFP 101 as response information in HTTP communication.

In step S905, the CPU 111 of the MFP 101 generates a Channel Selection screen 714 based on the channel information included in the received channel list information. Then, when the user selects the Channel Selection button 713, the CPU 111 of the MFP 101 displays the Channel Selection screen 714 on the touch panel 601 of the operation unit 116 and waits for an operation by the user. The Channel Selection screen 714 will be described below with reference to FIG. 15.

In step S906, when at least a channel is selected and then a return button 715 is selected in the Channel Selection screen 714, the CPU 111 of the MFP 101 applies the information about the upload destination channel.

In step S907, the CPU 111 of the MFP 101 receives a scan execution instruction via the operation unit 116.

In step S908, the CPU 111 of the MFP 101 scans an image based on the scan settings set at the time when the CPU 111 received the scan execution instruction.

In step S909, the CPU 111 of the MFP 101 generates image data for the scanned image, having the format set in the scan settings. The scan settings to be used are the ones specified in a Scan-to-Chat details setting screen (not illustrated) by the user. The scan settings may be displayed and set together with the transmission settings in a transmission setting screen 712 illustrated in FIG. 15.

In step S910, the CPU 111 of the MFP 101 transmits the information about the upload destination channel selected in step S906, the file format, the image data generated in step S909, and the user token information 1602, to the message application server 300 via the communication unit 126 in HTTP communication. By using the user token information 1602 registered in the MFP 101, the CPU 111 transmits information to the message application server 300 as a user who participates in the transmission destination work space. The user token information 1602 transmitted in this case is the user token information 1602 corresponding to the user logged into the MFP 101 at the time when the setting screen 704 is displayed. The CPU 111 may prompt the user to select which user's user token information 1602 is to be transmitted in the screen displayed on the operation unit 116. In this case, the user selects the user ID of the MFP 101.

The file format to be used is the one specified in the Scan-to-Chat transmission setting screen 712 by the user.

In step S911, the CPU 301 of the message application server 300 searches for the work space information registered in the user token information 1602 received in step S910, the bot application, and the user information of the chat service. Then, the CPU 301 stores the received image data and the channel specified in the channel information in an associated manner and stores the user specified in the user token information 1602 as an upload source (transmission source) account. In a case where the upload destination user is specified, the CPU 301 further stores the received image data, the channel, and the upload destination user in an associated manner Thus, when the user activates the message application on the mobile terminal 200 and then specifies a channel to confirm the contents of the channel conversation, a screen appears to indicate that the received image data has been uploaded.

In step S912, the CPU 301 of the message application server 300 transmits the result corresponding to the success or failure of the file upload, to the MFP 101 as response information in HTTP communication. In a case where the upload is successful, the CPU 111 of the MFP 101 may display a notification that the upload succeeded on the operation unit 116. In a case where the upload is a failure, the CPU 111 of the MFP 101 may display a notification that the upload failed on the operation unit 116. Alternatively, the CPU 111 may display no notification when the upload succeeded and display a notification that the upload failed only when the upload failed.

Figure 7:
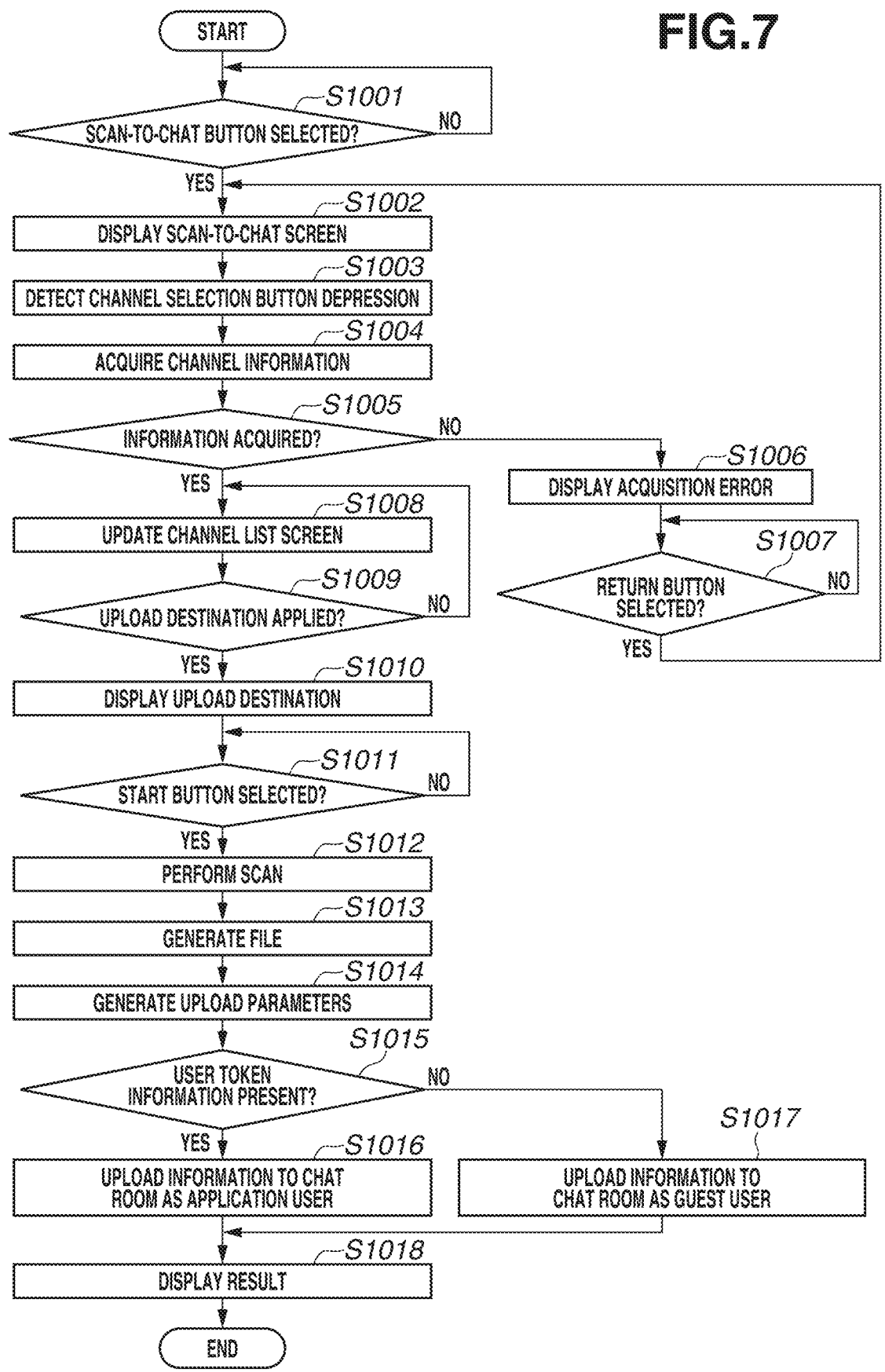
FIG. 7 is a flowchart illustrating an example of scan-to-chat processing performed by the MFP.

FIG. 7 is a flowchart illustrating an example of scan-to-chat processing performed by the MFP 101. The flowchart illustrated in FIG. 7 is implemented when the CPU 111 reads a program stored in the ROM 112 into the RAM 113 and executes the program. The flowchart illustrated in FIG. 7 is started when power of the MFP 101 is turned ON.

In step S1001, the CPU 111 determines whether the Scan-to-Chat button 602 is selected. In a case where the CPU 111 determines that the button is selected (YES in step S1001), the processing proceeds to step S1002. On the other hand, in a case where the CPU 111 determines that the button is not selected (NO in step S1001), the processing returns to step S1001.

In step S1002, the CPU 111 displays a Scan-to-Chat screen 704 on the touch panel 601 of the operation unit 116. The screen transition performed when the Scan-to-Chat button 602 is selected will be described below with reference to FIG. 15.

FIG. 15 illustrates an example of a screen transition in the scan-to-chat processing. When the Scan-to-Chat button 602 displayed on the Home screen 608 is selected, the Scan-to-Chat screen 704 appears on the touch panel 601 of the operation unit 116.

A Check Destination button 705 is displayed in the Scan-to-Chat screen 704. The Check Destination button 705 displays the number of destinations set as upload destinations for image data generated through image scanning. In the example illustrated in FIG. 15, one upload destination channel is selected. In a case where a plurality of destinations is selected, the set number of upload destinations is displayed as the number of destinations.

When the Check Destination button 705 is selected, a Scan-to-Chat destination confirmation screen 706 appears. When the Channel Selection button 713 is selected, the Scan-to-Chat destination confirmation screen 706 displays the set transmission setting upload destinations. In the destination confirmation screen 706, an upload destination button 707 displays the number of currently set upload destinations and, when selected by the user, displays the set upload destinations (destinations). When the upload destination button 707 is set, a detailed screen (not illustrated) appears to display details of set upload destinations.

Although, in the present exemplary embodiment, the Scan-to-Chat destination confirmation screen 706 displays only one upload destination, the present disclosure is not limited thereto. For example, when the MFP 101 sets a plurality of upload destinations from the message application server 300, the CPU 111 can display a plurality of upload destination buttons in the Scan-to-Chat destination confirmation screen 706.

When a Reset Destination 708 is selected in the Scan-to-Chat screen 704, the CPU 111 clears the set information. In this case, the set destination information is cleared. When a Start Monochrome button 709 or a Start Color button 710 is selected in the Scan-to-Chat screen 704, the CPU 111 starts processing for image scanning and transmission.

When a Transmission Settings button 711 is selected, the transmission setting screen 712 appears. This screen enables the user to change and check the transmission settings such as a transmission file setting 717.

When the Channel Selection button 713 is selected, the Channel Selection screen 714 appears. The channels and users are displayed in the Channel Selection screen 714 based on the channel list information received from the message application server 300 by the MFP 101. This screen enables the user to select an upload destination channel and select a user belonging to the channel to whom a notification is to be transmitted. More specifically, the user can select an upload destination channel and a partner to be mentioned. When a Channel button is selected, the users belonging to the channel are displayed in a pull-down menu. This screen enables the user to select both a channel and a user, or select only a channel to upload image data to all users belonging to the channel. The user may also select a plurality of channels, or select a channel and then select a plurality of users in the channel. The user may also select a plurality of channels and then select different users belonging to each channel.

When the return button 715 is selected, the contents of channel selection are stored, and the Scan-to-Chat screen 704 appears again. At this timing, an Upload Destination field 716 displays "Upload Destination: channel 3@user 1" indicating the name of the selected channel as the upload destination and the name of the notification destination user. The CPU 111 of the MFP 101 stores upload destinations based on the channels and users set at this timing, in the RAM 113 or the storage 114.

A user name 718 displays "User Name" or "Guest" for a user currently logged into the MFP 101. More specifically, in a case where the user token information 1602 associated with the user ID 1601 currently logged into the MFP 101 is registered in the table 1600, "User Name" is displayed. In a case where the user token information 1602 is not registered in the table 1600, "Guest" is displayed.

Referring back to the flowchart illustrated in FIG. 7, in step S1002, the CPU 111 displays the Scan-to-Chat screen 704 illustrated in FIG. 15 on the operation unit 116. In step S1003, the CPU 111 detects that the Channel Selection button 713 is selected.

In step S1004, upon selection of the Channel Selection button, the CPU 111 performs processing for transmitting information indicating a request for the channel information in HTTP communication, by using the pre-registered bot token information 1604, to the message application server 300.

In step S1005, the CPU 111 determines whether the channel information is received from the message application server 300 in response to the channel acquisition request transmitted in step S1004. More specifically, the CPU 111 determines that the channel list information is not received if the status code in the response in HTTP communication indicates an error or if the body information of the response includes a parameter indicating that information acquisition is not possible. In a case where the CPU 111 determines that the channel list information is received (YES in step S1005), the processing proceeds to step S1008. On the other hand, when the CPU 111 determines that the channel list information is not received (NO in step S1005), the processing proceeds to step S1006.

In step S1006, the CPU 111 displays information indicating that the channel list information was not received on the Channel Selection screen 714. At this timing, channel and user options are not displayed in the Channel Selection screen 714.

In step S1007, the CPU 111 determines whether the return button 715 is selected. In a case where the button is selected (YES in step S1007), the processing returns to step S1002. On the other hand, in a case where the button is not selected (NO in step S1007), the processing returns to step S1007.

In step S1008, the CPU 111 displays the Channel Selection screen 714 in which the channel information received from the message application server 300 is displayed, on the touch panel 601 of the operation unit 116.

In step S1009, the CPU 111 detects whether the upload destination selected in the Channel Selection screen 714 (channel, or channel and user) is applied, via the touch panel 601 of the operation unit 116. If the upload destination is applied (YES in step S1009), the processing proceeds to step S1010. In step S1010, the CPU 111 updates the upload channel list information. On the other hand, If the upload destination is not applied (NO in step S1009), the processing returns to step S1008. To detect whether the upload destination is applied, the CPU 111 determines whether the return button 715 is selected. If the return button 715 is selected, the CPU 111 detects that the upload destination is applied. With the screen configuration for displaying an Apply button on the screen of the operation unit 116, the CPU 111 performs a similar screen transition upon selection of the Apply button.

In step S1010, the CPU 111 displays the Scan-to-Chat screen 704 illustrated in FIG. 15 on the operation unit 116 and updates the display of the Upload Destination field 716 to the upload destination applied in step S1009. At this timing, the CPU 111 also displays information about notification destination users, together with the upload destination channel.

In step S1011, the CPU 111 determines whether the Start Monochrome button 709 or the Start Color button 710 displayed on the operation unit 116 is selected. In a case where the CPU 111 determines that either button is selected (YES in step S1011), the processing proceeds to step S1012. On the other hand, when the CPU 111 determines that neither button is selected (NO in step S1011), the processing returns to step S1011.

In step S1012, the CPU 111 controls the reading unit 118 based on the scan settings to read an image of a document to generate image data. The scan settings to be used are the ones specified in the Scan-to-Chat details setting screen (not illustrated) by the user.

In step S1013, the CPU 111 converts the image data generated in step S1012 into a File Format 717 set in the transmission setting screen.

In step S1014, the CPU 111 generates upload parameters. The upload parameters include the upload destination channel, file format, file name, and upload comment. For the file format, the CPU 111 sets the file format corresponding to the File Format 717 set in the transmission setting screen. For the upload comment, the CPU 111 generates a character string supplied with an at mark "@" at the top of information about the notification destination user. For the file name, the CPU 111 specifies the file name specified in the transmission setting screen.

In step S1015, the CPU 111 refers to the table 1600 to determine whether there exists the user token information 1602 associated with the user ID 1601 of the user logged into the MFP 101. In a case where the user token information 1602 is registered (YES in step S1015), the processing proceeds to step S1016. On the other hand, in a case where the user token information 1602 is not registered (NO in step S1015), the processing proceeds to step S1017. In a case where the user token information 1602 associated with the user ID 1601 does not exist refers to a case where the user selects the Chat Registration button 609 in the Home screen 608 and has not yet registered the authentication information for the MFP 101 and the authentication information for the message service in the screens illustrated in FIG. 13.

In step S1016, by using the user token information 1602, the CPU 111 transmits the file generated in step S1013, the upload parameters, and the user token information 1602 to the message application server 300 based on the POST method in HTTP communication. If a user logged into the MFP 101 has input a login ID and a password on the message service in advance in the input screens illustrated in FIG. 13, the acquired user token information 1602 is transmitted. In step S1017, the CPU 111 transmits the file generated in step S1013, the upload parameters, and the bot token information 1604 to the message application server 300 based on the POST method for HTTP communication. If a user currently logged into the MFP 101 has not input a login ID and a password on the message service in advance in the input screens illustrated in FIG. 13, the bot token information 1604 associated with the device is transmitted.

When the CPU 111 transmits these pieces of data (the file generated through image data conversion and the upload parameters) to the message application server 300, the message application server 300 controls the upload of the received file to the received user of the received channel.

In step S1018, the CPU 111 receives the upload result from the message application server 300 and then displays the upload result on the touch panel 601 of the operation unit 116. The present exemplary embodiment makes it easier for the user to upload a file from the MFP 101 to the channel of the message application server 300.

An example of a screen displayed on the operation panel 201 of the mobile terminal 200 will be described below with reference to FIG. 12. This screen is displayed upon transmission of a file (generated through image data conversion in the processing in steps S1016 and S1017) and the upload parameters to the message application server 300.

According to the present exemplary embodiment, when the user token information 1602 is not associated with the user ID of the user currently logged in, like step S1015 illustrated in FIG. 7, the bot token information 1604 is transmitted to the message application server 300. This enables a user not having registered the authentication information for the message service to display a screen on the message service and image data generated through image scanning. In this case, a message 1204 of a message application screen 1201 is displayed as if the message 1204 was uploaded by a bot application called "MFP".

Figure 12:
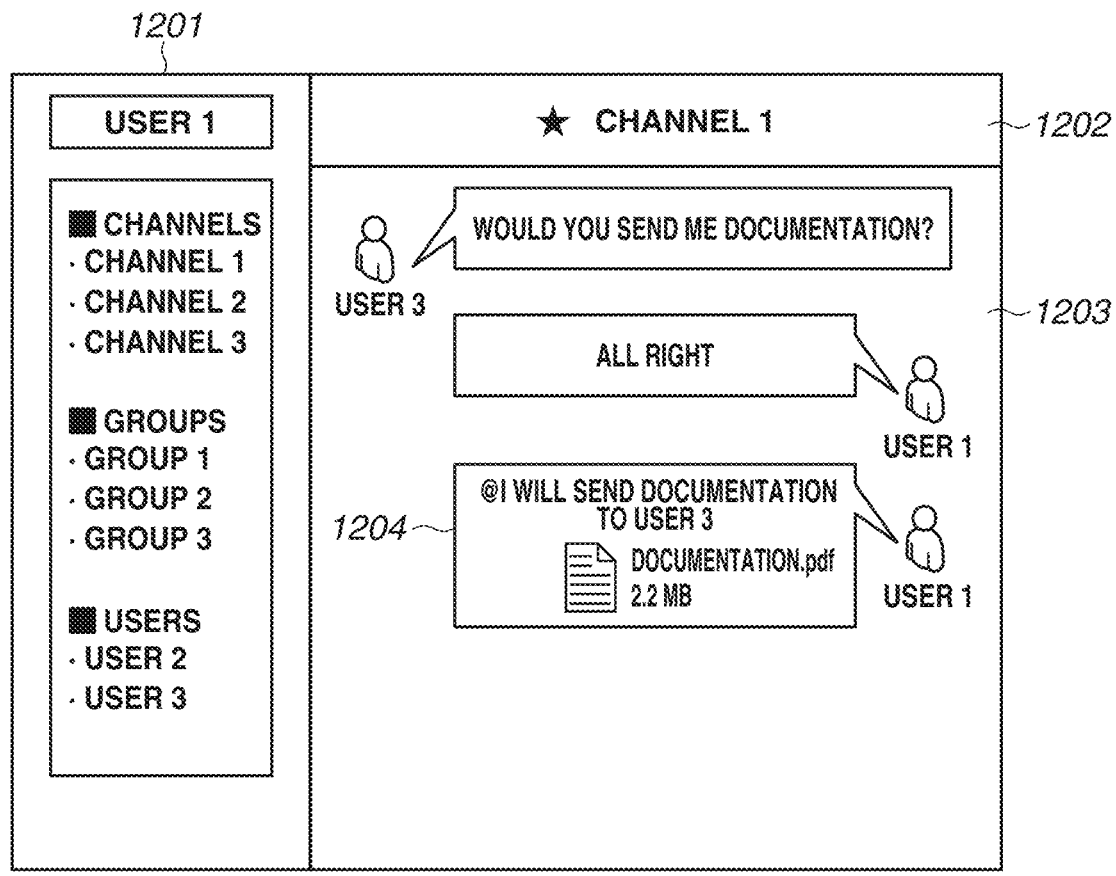
FIG. 12 illustrates an example of a message screen of a message application.

FIG. 12 illustrates an example of a message screen of the message application. The message application screen 1201 illustrated in FIG. 12 is displayed when a message application is activated on the mobile terminal 200 and the processing in step S1015 is performed on the MFP 101. The mobile terminal 200 communicates with the message application server 300.

When the user activates the message application on the mobile terminal 200 and inputs the ID and the password for the account of the user to log into the MFP 101, a screen dedicated for the user appears.

The message 1204 is displayed (uploaded) when a user having account "User 1" on the message service transmits image data generated through image scanning on the MFP 101 and the upload parameters to the message application server 300. Referring to the example illustrated in FIG. 12, "Channel 1" is specified as the upload destination channel out of the upload parameters, and "User 3" belonging to Channel 1 is specified as a user. Also, in this example, "Documentation.pdf" is specified as the file name of the upload parameters, and "I Will Send Documentation to User 3" is specified as a comment. The file name and the comment are specified in the Scan-to-Chat details setting screen (not illustrated) by the user.

The message application screen 1201 displays the channel in which the logged-in user is participating, the group, and the user. The message application screen 1201 also displays communication partner information 1202 and a message exchange 1203. At the time of uploading, by attaching a comment supplied with "@" at the top of the user name, the message 1204 indicates that the user uploading this information wants to send a notification particularly to the specified user in the channel Referring to the example illustrated in FIG. 12, User 3 can recognize the reception of the uploaded message earlier than any other members belonging to the channel, depending on the terminal on which the message application is viewed. If the mobile terminal 200 viewed by User 3 is a smart phone, the mobile terminal 200 notifies the user by using an icon notification function, vibration, and ringtone. If User 3 uses the message application on a desktop terminal, the desktop terminal notifies the user by using a desktop notification function. When displaying this screen, the message application server 300 searches for necessary information from the data structure illustrated in FIG. 11 and displays the information. For example, the upload of the message 1204 corresponds to "Remark 3+File 1" in an exchange content 505. Attribute information such as the name of File 1 is acquired from Files 504, and the attribute information is displayed as a file icon on the message 1204. When the user selects this file icon, the user can acquire File 1 belonging to Files 504. Although, in this example, the file uploaded to this channel is displayed as an icon, a preview image of the file may be displayed.

If image data, even image data transmitted from the MFP 101 in this way, is uploaded with an account on the message service, it is easy to determine who uploaded the image data.

Figure 11:
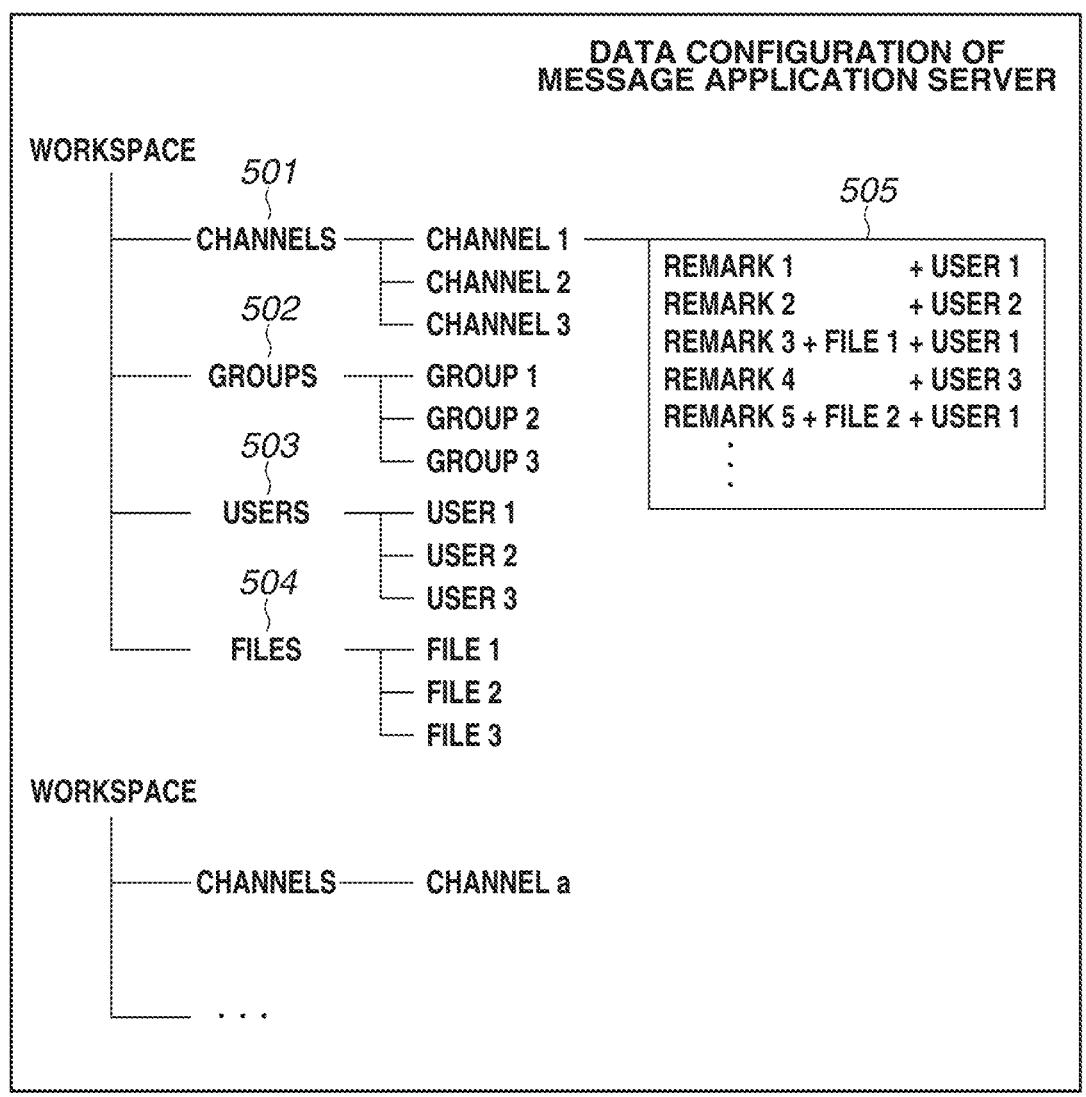
FIG. 11 illustrates an example of a file structure in the message application server.

FIG. 11 illustrates an example of a file structure in the message application server 300. This file structure is stored in the HDD 305 of the message application server 300. The screen illustrated in FIG. 12 is displayed based on this file structure. The message application server 300 manages data based on small clusters such as channels, groups, users, and files within the largest cluster called a work space. Channels 501 include chat rooms which all members of the work space can participate in. All the contents uploaded can be retrieved by anyone. Groups 502 are channels for discussions that are to be disclosed to not all members. An invitation is necessary for viewing and participation in groups. Users 503 include users participating in this work space. Files 504 store attached files. The exchange content 505 for channels, groups, and users is stored in an associated manner. For example, users participating in Channel 1 are stored in association with Channel 1, and messages and image data exchanged in Channel 1 are also stored in association with Channel 1. Under this storage condition, when a channel is selected in the Channel Selection screen 714, users corresponding to the specified channel information can be displayed. Users participating in the channel can also be displayed.

Performing the above-described processing makes it possible to determine which user displayed image data generated through image scanning by an image processing apparatus, and to reduce the possibility of authentication information for the chat service being leaked.

The first exemplary embodiment has been described above centering on an example where the MFP 101 directly transmits image data and the upload parameters to the message application server 300. A second exemplary embodiment will be described below centering on an example where the MFP 101 transmits image data and the upload parameters to the message application server 300 via the bot server 400. According to the present exemplary embodiment, the table 1600 is stored in the HDD 405 of the bot server 400.

Figure 8:
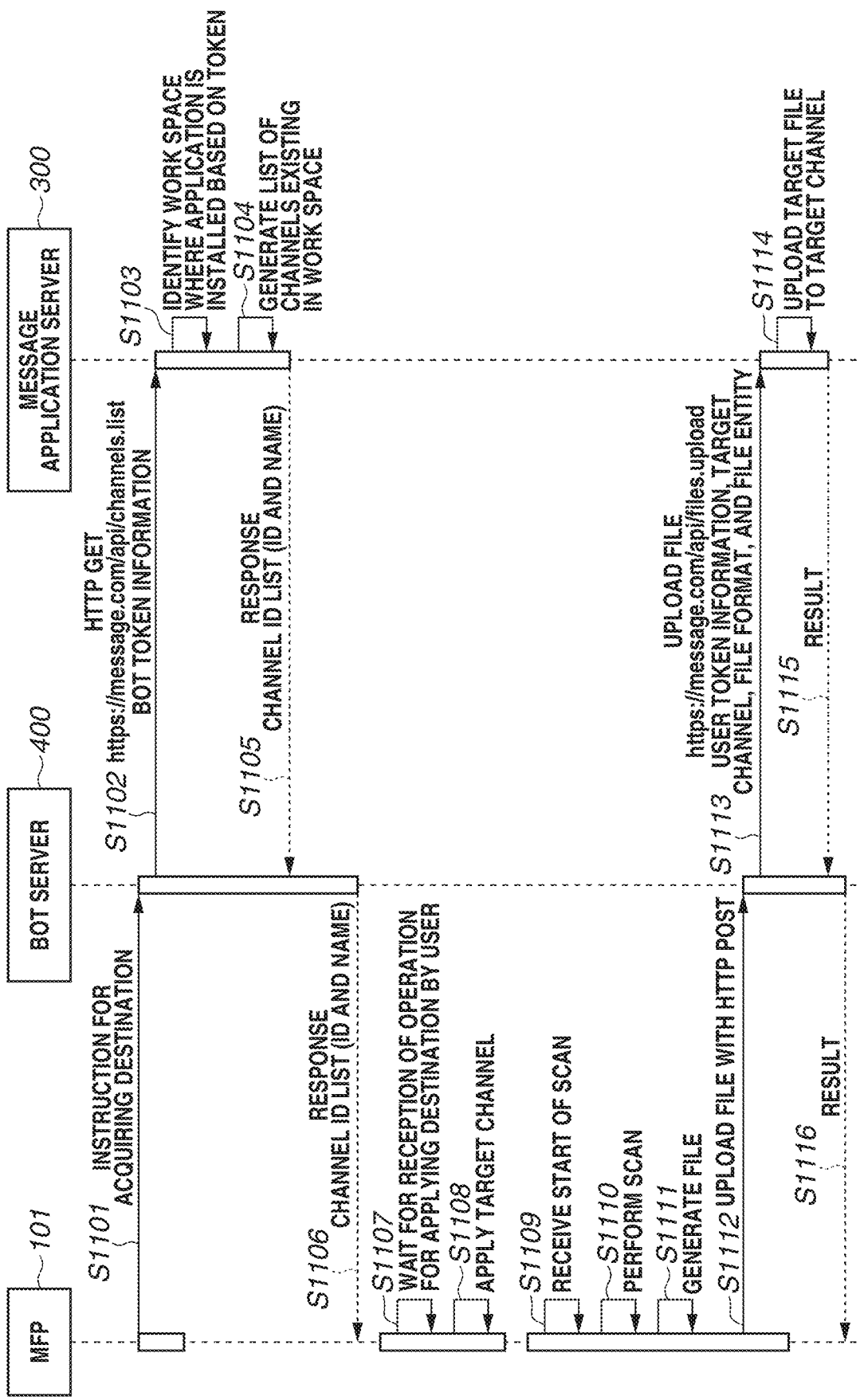
FIG. 8 illustrates an example of a sequence for transmitting a file generated through image scanning by the MFP to the message application server via the bot server.

FIG. 8 illustrates an example of a sequence in which the MFP 101 transmits a file generated through image scanning to the message application server 300 via the bot server 400.

In step S1101, the CPU 111 of the MFP 101 requests the bot server 400 for the channel list information in HTTP communication, by using the device ID as a parameter.

In step S1102, the CPU 401 of the bot server 400 transmits, to the message application server 300, information indicating a request for the channel list information in HTTP communication by using the bot token information 1604 corresponding to the received device ID 1603. The token information corresponding to the device ID 1603 received in step S1101 is acquired.

In step S1103, the CPU 301 of the message application server 300 searches for the registered work space information and bot application from the bot token information 1604.

In step S1104, the CPU 301 of the message application server 300 confirms whether access to the executed URL is permitted based on the application information. If access to the URL is permitted, the CPU 301 generates channel list information for channels belonging to the work space. The channel list information is channel information arranged in list form. The channel information includes setting values such as the channel ID, the channel name, a list of member IDs belonging to the channel, and the archive channel setting.

In step S1105, the CPU 301 of the message application server 300 controls the communication unit 304 to transmit the channel list information to the bot server 400 as response information in HTTP communication.

In step S1106, the CPU 401 of the bot server 400 transmits the channel list information received in step S1105 to the MFP 101 as a response in HTTP communication.

Processing in steps S1107 to S1111 is similar to the processing in steps S905 to S909 illustrated in FIG. 6, respectively, and redundant descriptions thereof will be omitted.

In step S1112, the CPU 111 of the MFP 101 transmits the device ID 1603, the user ID 1601, information about the upload destination channel, information about the file format, and image data to the bot server 400 in HTTP communication.

In step S1113, the CPU 401 of the bot server 400 performs processing for transmitting the received information about the upload destination channel, information about the file format, and image data to the message application server 300. In this case, the CPU 401 attaches the bot token information 1604 corresponding to the device ID 1603, or the user token information 1602 corresponding to the user ID 1601 as authentication information. In this case, the CPU 401 determines the token information to be transmitted by referring to the table 1600 stored in the HDD 405, in which the device ID 1603 or the user ID 1601 is associated with the token information. FIG. 8 illustrates an example where a file upload is performed by using the user token information 1602.

Processing in step S1114 is similar to the processing in step S911, and a redundant description thereof will be omitted.

In step S1115, the CPU 301 of the message application server 300 transmits the result corresponding to the success or failure of the file upload, to the bot server 400 as response information in HTTP communication.

In step S1116, the CPU 401 of the bot server 400 transmits the result corresponding to the success or failure of the file upload, to the MFP 101 as response information in HTTP communication. In a case where the upload is successful, the CPU 111 of the MFP 101 may display a notification that the upload succeeded on the operation unit 116. On the other hand, in a case where the upload is a failure, the CPU 111 of the MFP 101 may display a notification that the upload failed on the operation unit 116. The CPU 111 may display no notification when the upload succeeded and display a notification that the upload failed only when the upload failed.

Although, in the exemplary embodiment, the channel list is acquired, it is also possible to upload a group list with an access limitation and a user list for each upload by using a similar method.

Figure 9:
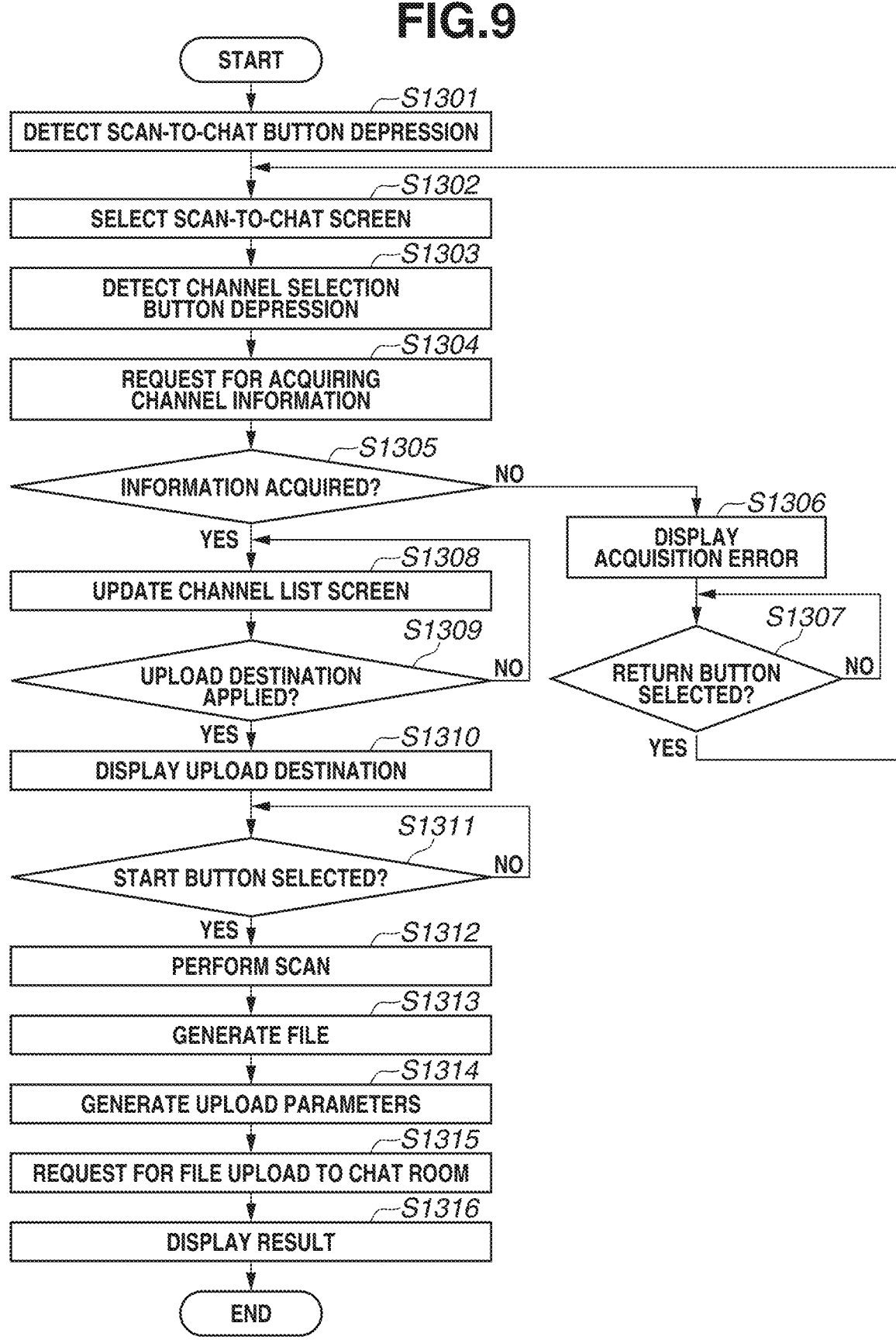
FIG. 9 is a flowchart illustrating an example of the scan-to-chat processing.

FIG. 9 is a flowchart illustrating an example of scan-to-chat processing. The flowchart illustrated in FIG. 9 is implemented when the CPU 111 reads a program stored in the ROM 112 into the RAM 113 and executes the program. The flowchart illustrated in FIG. 9 is started when power of the MFP 101 is turned ON.

Processing in steps S1301 to S1303 is similar to the processing in steps S1001 to S1003, respectively, and redundant descriptions thereof will be omitted.

In step S1304, the CPU 111 acquires the device ID 1603 of the MFP 101 logged into the MFP 101 and transmits a request for acquiring the channel information and the device ID 1603 to the bot server 400 in HTTP communication.

Processing in steps S1305 to S1314 is similar to the processing in steps S1005 to S1014, respectively, and redundant descriptions thereof will be omitted.

In step S1315, the CPU 111 transmits the user ID 1601 of the user logged into the MFP 101 or the device ID 1603 of the MFP 101, and the file generated in step S1313 and the upload parameters. Although, in the exemplary embodiment, the user ID 1601 of the logged-in user and the device ID 1603 are used for communication with the bot server 400, a uniquely determined identifier such as a tenant ID can also be used.

Figure 10:
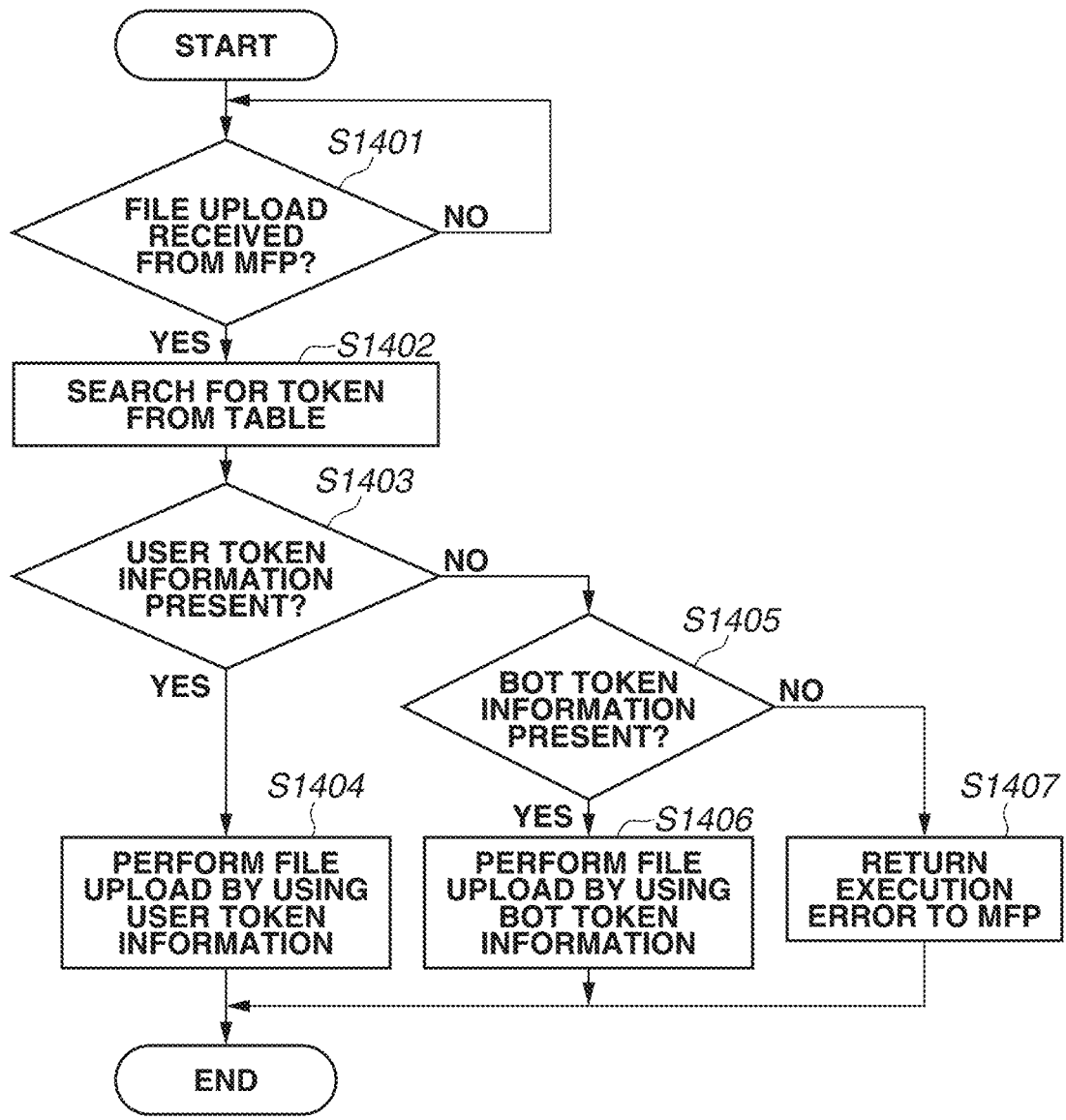
FIG. 10 is a flowchart illustrating an example of processing performed by the bot server to transmit image data to the message application server.

FIG. 10 is a flowchart illustrating an example of processing performed by the bot server 400 to transmit image data to the message application server 300. The flowchart illustrated in FIG. 10 is implemented when the CPU 401 reads a program stored in the ROM 402 into the RAM 403 and then executes the program. The flowchart illustrated in FIG. 10 is started when power of the bot server 400 is turned ON.

In step S1401, the CPU 401 determines whether the device ID 1603 or the user ID 1601, and a request for file upload to the message application server 300 are received from the MFP 101. In a case where the CPU 401 determines that these pieces of information are received (YES in step S1401), the processing proceeds to step S1402. On the other hand, in a case where the CPU 401 determines that these pieces of information are not received (NO in step S1401), the processing returns to step S1401.

In step S1402, the CPU 401 searches for the corresponding token information in the table 1600 by using the ID received from the MFP 101 as a key. In step S1403, the CPU 401 determines whether the user token information 1602 corresponding to the ID exists. When the CPU 401 determines that the user token information 1602 exists (YES in step S1403), the processing proceeds to step S1404. On the other hand, when the CPU 401 determines that the user token information 1602 does not exist (NO in step S1403), the processing proceeds to step S1405.

In step S1404, the CPU 401 transmits the request for file upload received from the MFP 101 in step S1401 to the message application server 300, by using the user token information 1602 identified in step S1403. The CPU 401 transmits information returned as a response from the message application server 300, to the MFP 101.

In step S1405, the CPU 401 determines whether the bot token information 1604 corresponding to the ID exists. If the CPU 401 determines that the bot token information 1604 exists (YES in step S1405), the processing proceeds to step S1406. On the other hand, if the CPU 401 determines that the bot token information 1604 does not exist (NO in step S1405), the processing proceeds to step S1407.

In step S1406, the CPU 401 transmits the request for file upload received from the MFP 101 in step S1401 to the message application server 300, by using the bot token information 1604 identified in step S1403. The CPU 401 transmits information returned as a response from the message application server 300, to the MFP 101.

In step S1407, the CPU 401 transmits information indicating an execution error to the MFP 101 as a response to the request received in step S1401.

The flowchart illustrated in FIG. 10 has been described above centering on an example to be performed upon reception of the user ID or the device ID and a request for file upload transmitted in step S1112 in the sequence illustrated in FIG. 8. Also, upon reception of the user ID or the device ID and an upload destination channel request transmitted in step S1101, the CPU 401 performs a similar processing flow to that illustrated in FIG. 10. More specifically, if there exists token information corresponding to the received device ID or user ID, the CPU 401 transmits the token information, the upload destination channel information, and a file (image data) to the message application server 300. If there exists no token information corresponding to the received device ID or user ID, the CPU 401 transmits information indicating an error to the MFP 101.

Even when the interface specifications of the message application server 300 are changed, the present exemplary embodiment enables implementing a file upload simply by updating the program of the bot server 400 without updating the program of the MFP 101. In a workplace where a plurality of MFPs is used, the present exemplary embodiment enables performing a file upload even without performing token settings for each individual MFP.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-230918, filed Dec. 20, 2019, which is hereby incorporated by reference herein in its entirety.

What is claimed is:

1. A scanning apparatus comprising:
a scanner that scans a document to generate image data;
a controller,
wherein the controller receives an input of authentication information to be used for a log-in to a chat service,
wherein the controller obtains, based on transmission of the input authentication information, token information corresponding to the input authentication information,
wherein the token information is either user token information or bot token information,
wherein the controller receives, from a user, selection of a channel from a plurality of channels of the chat service; and
a communicator that transmits the generated image data and information indicating the selected channel to a server relating to the chat service when the user token information is available, the communicator transmits the generated image data and information indicating the selected channel to the server relating to the chat service using the bot token information when the user token information is unavailable,
wherein the image data is posted in the specified channel as a post of a user corresponding to the input token information.

2. The scanning apparatus according to claim 1, wherein the token information is generated by the server, and
wherein the communicator transmits the input authentication information to the server and receives the generated token information from the server.

3. The image processing apparatus according to claim 1, further comprising:
a user interface that displays information indicating the plurality of channels of the chat service; and
wherein the controller receives selection of the displayed information indicating the plurality of channels of the chat service,
wherein the communicator transmits the generated image data, information indicating the channel corresponding to information selected from the displayed information and the obtained token information to the server relating to the chat service.

4. The scanning apparatus according to claim 1, wherein the scanner scans, based on an execution instruction input by the user while a predetermined screen is displayed on the user interface, the document to generate the image data.

5. The scanning apparatus according to claim 1, wherein, based on receiving an execution instruction, the scanner scans the document to generate image data and then the communicator transmits the image data generated by the scanner to the server.

6. The scanning apparatus according to claim 5, wherein the execution instruction is selection of a predetermined object.

7. The scanning apparatus according to claim 1, wherein the channel of the chat service is a chat room.

8. The scanning apparatus according to claim 1, wherein the controller receives, from the user, a file name of the image data to be transmitted to the server, and wherein the controller receives the file name of the image data before the scanner scans the document to generate the image data.

9. The scanning apparatus according to claim 1, wherein the communicator transmits the image data in Hypertext Transfer Protocol (HTTP) communication.

10. A scanning method comprising:

receiving an input of authentication information to be used for a log-in to a chat service;

obtaining, based on transmission of the input authentication information, token information corresponding to the input authentication information, wherein the token information is either user token information or bot token information;

receiving, from a user, selection of a channel from a plurality of channels of the chat service;

scanning a document to generate image data; and transmitting the generated image data and information indicating the selected channel to a server relating to the chat service when the user token information is available, transmitting the generated image data and information indicating the selected channel to the server relating to the chat service using the bot token information when the user token information is unavailable, wherein the image data is posted in the specified channel as a post of a user corresponding to the input token information.

11. The scanning method according to claim 10, wherein the token information is generated by the server, and wherein the input authentication information is transmitted to the server and the generated token information is received from the server.

12. The scanning method according to claim 10, the method further comprising:

displaying information indicating the plurality of channels of the chat service; and receiving selection of the displayed information indicating the plurality of channels of the chat service, wherein the generated image data, information indicating the channel corresponding to information selected from the displayed information and the obtained token information are transmitted to the server relating to the chat service.

13. The scanning method according to claim 10, wherein the document is scanned, based on an execution instruction input by the user while a predetermined screen is displayed, to generate the image data.

14. The scanning method according to claim 10, wherein, based on receiving an execution instruction, the document is scanned to generate image data and then the generated image data is transmitted to the server.

15. The scanning method according to claim 14, wherein the execution instruction is selection of a predetermined object.

16. The scanning method according to claim 10, wherein the channel of the chat service is a chat room.

17. The scanning method according to claim 10, further comprising:

receiving, from the user, a file name of the image data to be transmitted to the server, wherein the file name of the image data is received before the document is scanned to generate the image data.

18. The scanning method according to claim 10, wherein the image data is transmitted in HTTP communication.

19. A non-transitory computer-readable storage medium storing a program that, when executed by a computer, causes the computer to perform a scanning method, the scanning method comprising:

receiving an input of authentication information to be used for a log-in to a chat service;

obtaining, based on transmission of the input authentication information, token information corresponding to the input authentication information, wherein the token information is either user token information or bot token information;

receiving, from a user, selection of a channel from a plurality of channels of the chat service;

scanning a document to generate image data; and transmitting the generated image data and information indicating the selected channel to a server relating to the chat service when the user token information is available, the communication transmits the generated image data and information indicating the selected channel to the server relating to the chat service using the bot token information when the user token information is unavailable, wherein the image data is posted in the specified channel as a post of a user corresponding to the input token information.

* * * * *